US 8,760,700 B2

(12) United States Patent
Morita

(10) Patent No.: US 8,760,700 B2
(45) Date of Patent: Jun. 24, 2014

(54) METHOD, APPARATUS, AND COMPUTER PRODUCT FOR MANAGING IMAGE FORMATION RESOURCES

(75) Inventor: Tetsuya Morita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/473,308

(22) Filed: May 16, 2012

(65) Prior Publication Data

US 2012/0224210 A1 Sep. 6, 2012

Related U.S. Application Data

(60) Continuation of application No. 11/386,828, filed on Mar. 23, 2006, now abandoned, which is a division of application No. 09/897,136, filed on Jul. 3, 2001, now Pat. No. 7,209,249.

(30) Foreign Application Priority Data

| Jul. 5, 2000 | (JP) | 2000-204235 |
| Jul. 5, 2000 | (JP) | 2000-204257 |
| May 16, 2001 | (JP) | 2001-147014 |
| May 16, 2001 | (JP) | 2001-147015 |

(51) Int. Cl.
*G06F 3/12* (2006.01)
(52) U.S. Cl.
USPC ............ 358/1.15; 700/99; 700/100; 719/313; 719/321
(58) Field of Classification Search
USPC ......... 358/1.15, 1.14, 1.6; 719/321, 313, 317; 715/255, 762; 707/1; 700/99, 100
See application file for complete search history.

(56) References Cited

U.S. PATENT DOCUMENTS

| 5,467,181 | A | | 11/1995 | Doi |
| 5,600,445 | A | * | 2/1997 | Omi ............................... 358/296 |
| 5,764,866 | A | * | 6/1998 | Maniwa ......................... 358/1.15 |
| 5,768,483 | A | * | 6/1998 | Maniwa et al. ............... 358/1.15 |
| 5,838,456 | A | | 11/1998 | Wagi et al. |
| 5,995,712 | A | | 11/1999 | Doi |
| 6,020,971 | A | | 2/2000 | Kato et al. |
| 6,041,183 | A | | 3/2000 | Hayafune et al. |

(Continued)

FOREIGN PATENT DOCUMENTS

| DE | 198-14-522 | 11/1998 |
| JP | 5-250371 | 9/1993 |

OTHER PUBLICATIONS

Murakawa et al., "Docustations IM200", Fuji Xerox Technical Report, Fuji Xerox Co., Ltd., No. 11, pp. 126-129, Mar. 27, 1997 (with partical English translation).

*Primary Examiner* — King Poon
*Assistant Examiner* — Jamares Q Washington
(74) *Attorney, Agent, or Firm* — Oblon, Spivak, McClelland, Maier & Neustadt, L.L.P.

(57) ABSTRACT

Common portions of applications are extracted as common system service. A platform is formed by the common system service and a general purpose OS. A printer application, a copy application, and various applications are mounted on the platform. As a result, each software (application) corresponding to a printer, a copier, a facsimile device, and so on can be developed efficiently and the productivity of the apparatus as a whole can be improved.

10 Claims, 18 Drawing Sheets

(56) References Cited

U.S. PATENT DOCUMENTS

| | | |
|---|---|---|
| 6,049,396 A | 4/2000 | Wagi et al. |
| 6,073,132 A | 6/2000 | Gehman |
| 6,252,614 B1 | 6/2001 | Mullin |
| 6,356,354 B1 | 3/2002 | Prenn et al. |
| RE38,164 E | 7/2003 | Wagi et al. |
| 6,775,022 B2 | 8/2004 | Noyes et al. |
| 6,806,977 B1 * | 10/2004 | Freeny et al. ............... 358/1.15 |
| 2006/0158675 A1 | 7/2006 | Morita |

* cited by examiner

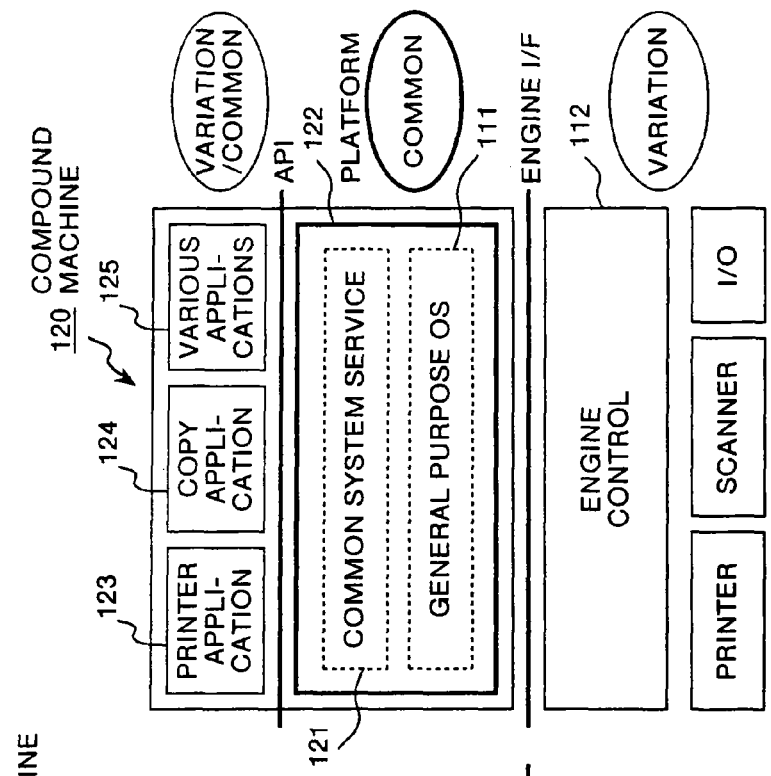
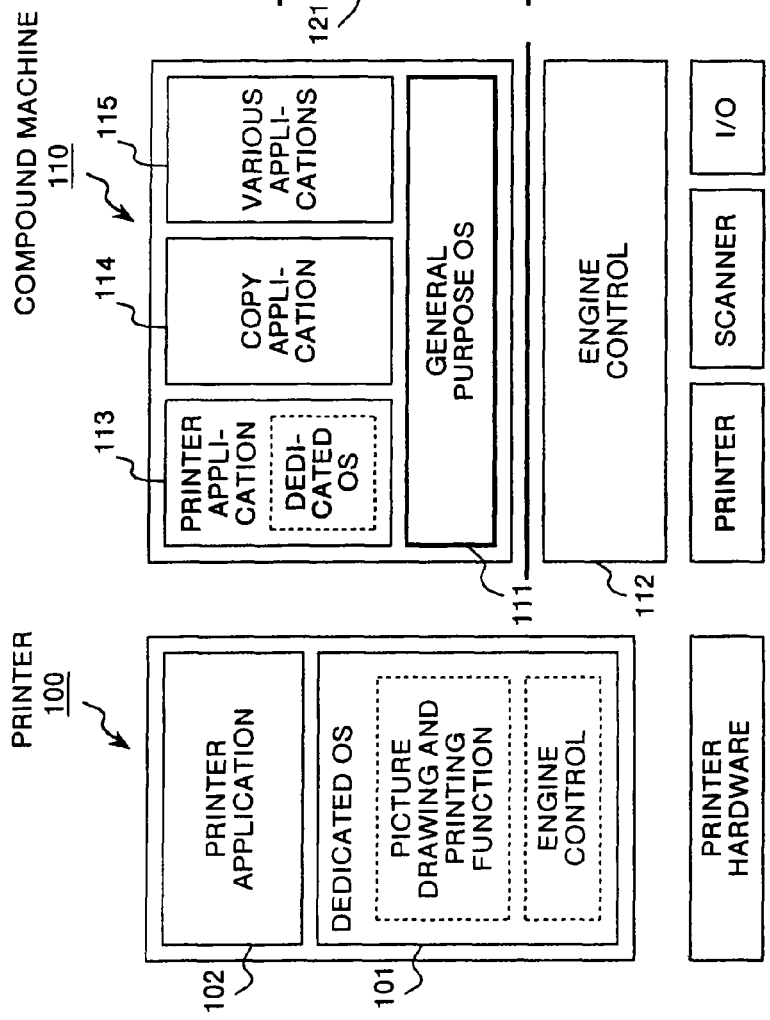

METHOD, APPARATUS, AND COMPUTER PRODUCT FOR MANAGING IMAGE FORMATION RESOURCES

CROSS-REFERENCE TO RELATED APPLICATIONS

This application is a continuation of and claims the benefit of priority under 35 U.S.C. §120 for U.S. Ser. No. 11/386,828, filed Mar. 23, 2006, the entire contents of which is incorporated herein by reference. U.S. Ser. No. 11/386,828 is a divisional of U.S. Ser. No. 09/897,136, filed Jul. 3, 2001 (now U.S. Pat. No. 7,209,249) this application also claims the benefit of priority under 35 U.S.C. §119 from Japanese Patent Application Nos. 2000-204235, filed Jul. 5, 2000, 2000-204257, filed Jul. 5, 2000, 2001-147014, filed May 16, 2001 and 2001-147015, filed May 16, 2001, the entire content of each of which are incorporated herein by reference.

FIELD OF THE INVENTION

The present invention relates to an image formation apparatus having hardware resources used in image formation processing in its display section, print section, imaging section and so on and providing user service, such as a printer, copier or facsimile, relating to image formation processing, and relates to an image formation method and a program of such an image formation apparatus. More particularly, this invention relates to such an image formation apparatus, image formation method, and program that each software (application) corresponding to a printer, a copier, a facsimile device, and so on can be developed efficiently and the productivity of the apparatus as a whole can be improved.

BACKGROUND OF THE INVENTION

A few years ago printers, copiers and facsimiles are typically implemented so as to have respective separate casings. In recent years, however, an image formation apparatus (hereafter referred to as "compound machine") having functions of all of these apparatuses in one casing is known.

In this compound machine, a display section, a print section, and an imaging function are included in one casing. In addition, three kinds of software respectively corresponding to a printer, a copier and a facsimile device are provided. The apparatus is made to operate as a printer, a copier and a facsimile device by software switchover.

By using such a compound machine, it becomes unnecessary to provide a printer, a copier and a facsimile device separately in a room. As a result, the total cost and space can be reduced.

However, if software programs (including dedicated operating systems) respectively corresponding to a printer, a copier and a facsimile device are provided separately in such a compound machine, a lot of time is required for developing respective software programs.

In other words, such a conventional compound machine is nothing but a machine having one consolidated c sing. In the same way as the conventional art, software for printer, software for copier, and software for facsimile must be developed separately.

Originally, software for printer, software for copier, and software for facsimile can share algorithm in various aspects because of such a nature that they handle the same kind of images. If software programs are produced separately, therefore, there occurs a problem that the memory capacity is increased accumulatively.

Recently, however, a general purpose OS such as UNIX is often adopted in such a compound machine in order to save repeated processing of the case where three kinds of dedicated operating systems are provided separately. If only an OS part is shared, however, the development efficiency of software cannot be so increased.

In Japanese Patent Application Publication No. 7-79368, there is disclosed an electronic print system that hierarchizes a document service architecture by using an application layer including a server dialog and a distributed application, a function layer including a font manager and a network manager, and a control layer including an operating system. However, this electronic print system of the conventional art is nothing but a system in that a partial function such as fonts is shared. The development efficiency of each software is not improved.

Furthermore, a plurality of applications can be mounted on a personal computer connected to the compound machine, a printer or the like. However, this personal computer does not manage hardware resources relating to the compound machine. The present invention does not relate to a personal computer, but relates to an image formation apparatus itself, such as a compound machine, to which a personal computer is connected.

SUMMARY OF THE INVENTION

It is an object of the present invention to provide such a method if and an apparatus for image formation that each software (application) corresponding to a printer, a copier, a facsimile device, and so on can be developed efficiently and the productivity of the apparatus as a whole can be improved. It is an another object of this invention to provide a computer program which can realize the method according to present invention on a computer.

The image formation apparatus according to one aspect of the present invention includes hardware resources, such as a display section, a print section, and an imaging section, used in image formation processing and which provides user service, such as print, copy, or facsimile, relating to image formation processing. This image formation apparatus comprises applications each of which conducts processing peculiar to user service such as print, copy, or facsimile and which can be mounted in a plurality on the image formation apparatus; and a platform which is interposed between the applications and the hardware resources, and which conducts management of the hardware resources, execution control and image formation processing needed in common by at least two of the applications when providing the user service.

Thus, the image formation apparatus includes applications each of which conducts processing peculiar to user service such as print, copy, or facsimile and which can be mounted in a plurality on the image formation apparatus; and a platform which is interposed between the applications and the hardware resources, and which conducts management of the hardware resources, execution control and image formation processing needed in common by at least two of the applications when providing the user service. When creating an application of each user service, therefore, only portions other than the platform need to be created.

The image formation method according to another aspect of the present invention provides user service, such as print, copy, or facsimile, relating to image formation processing, by using hardware resources, such as a display section, a print section, and an imaging section, used in image formation processing. This image formation method comprises the steps of conducting processing peculiar to user service such as print, copy, or facsimile by using applications which can be mounted in a plurality; and conducting management of the hardware resources, execution control and image formation processing needed in common by at least two of the applications, when providing the user service, by using a platform interposed between the applications and the hardware resources.

Thus, processing peculiar to user service such as print, copy, or facsimile is conducted by using applications which can be mounted in a plurality; and management of the hardware resources, execution control and image formation processing needed in common by at least two of the applications is conducted, when providing the user service, by using a platform interposed between the applications and the hardware resources. When creating an application of each user service, therefore, only portions other than the platform need to be created.

The application programs according to still another aspect of the present invention which can be mounted in a plurality on an image formation apparatus, the image formation apparatus including hardware resources, such as a display section, a print section, and an imaging section, used in image formation processing and providing user service, such as print, copy, or facsimile, relating to image formation processing. Each of the application programs is executed to operate on a platform which conducts management of the hardware resources, execution control and image formation processing, when providing user service such as print, copy, or facsimile.

Thus, each of the application programs is executed to operate on a platform which conducts management of the hardware resources, execution control and image formation processing, when providing user service such as print, copy, or facsimile. Therefore, application programs each having a reduced processing burden by using the platform can be provided.

The image formation apparatus according to still another aspect of the present invention which includes hardware resources, such as a display section, a print section, and an imaging section, used in image formation processing and which provides user service, such as print, copy, or facsimile, relating to image formation processing. This image formation apparatus comprises applications each of which conducts processing peculiar to user service such as print, copy, or facsimile and which can be mounted in a plurality on the image formation apparatus; and a platform which is interposed between the applications and the hardware resources, and which conducts management of the hardware resources, execution control and image formation processing needed in common by at least two of the applications when providing the user service. The platform comprises common system service which conducts management of the hardware resources, execution control and image formation processing; and application service which is interposed between the plurality of applications and the common system service and which at least conducts job generation corresponding to applications.

Thus, the image formation apparatus includes applications each of which conducts processing peculiar to user service such as print, copy, or facsimile and which can be mounted in a plurality on the image formation apparatus; and a platform which is interposed between the applications and the hardware resources, and which conducts management of the hardware resources, execution control and image formation processing needed in common by at least two of the applications when providing the user service. In addition, the platform includes common system service which conducts management of the hardware resources, execution control and image formation processing; and application service which is interposed between the plurality of applications and the common system service and which at least conducts job generation corresponding to applications. When creating an application of each user service, therefore, only portions of the screen display control and key operation need to be created.

The image formation method according to still another aspect of the present invention which provides user service, such as print, copy, or facsimile, relating to image formation processing, by using hardware resources, such as a display section, a print section, and an imaging section, used in image formation processing. This image formation method comprises the steps of conducting processing peculiar to user service such as print, copy, or facsimile by using applications which can be mounted in a plurality; and conducting management of the hardware resources, execution control and image formation processing needed in common by at least two of the applications, when providing the user service, by using a platform. The platform includes common system service which is interposed between the applications and the hardware resources and which conducts management of the hardware resources, execution control and image formation processing, and application service which is interposed between the applications and the common system service and which conducts at least job generation corresponding to an application.

Thus, processing peculiar to user service such as print, copy, or facsimile is conducted by using applications which can be mounted in a plurality; and management of the hardware resources, execution control and image formation processing needed in common by at least two of the applications are conducted, when providing the user service, by using a platform. In addition, the platform includes common system service which is interposed between the applications and the hardware resources and which conducts management of the hardware resources, execution control and image formation processing, and application service which is interposed between the applications and the common system service and which conducts at least job generation corresponding to an application. When creating an application of each user service, therefore, only portions of the screen display control and key operation need to be created.

The application programs according to still another aspect of the present invention which can be mounted in a plurality on an image formation apparatus, the image formation apparatus including hardware resources, such as a display section, a print section, and an imaging section, used in image formation processing and providing user service, such as print, copy, or facsimile, relating to image formation processing. Each of the application programs is executed to operate on a platform, when providing user service such as print, copy, or facsimile, and the platform includes common system service which conducts management of the hardware resources, execution control and image formation processing, and application service which is interposed between the applications and the common system service and which conducts at least job generation corresponding to an application.

Thus, each of the application programs is executed to operate on a platform, when providing user service such as print, copy, or facsimile. In addition, the platform includes common system service which conducts management of the hardware resources, execution control and image formation processing, and application service which is interposed between the applications and the common system service and which conducts at least job generation corresponding to an application. Therefore, application programs each having a reduced processing burden by using the platform can be provided.

Other objects and features of this invention will become apparent from the following description with reference to the accompanying drawings.

BRIEF DESCRIPTION OF THE DRAWINGS

FIG. 1A to FIG. 1C are diagrams showing a concept of a compound machine according to a first embodiment of the present invention;

DESCRIPTION OF THE PREFERRED EMBODIMENTS

Embodiments of a method of and an apparatus for image formation, and a computer program according to the present invention will be explained in detail by referring to accompanying drawing. These embodiments assume a case in which the present invention is applied to a compound machine.

Figure 2A:
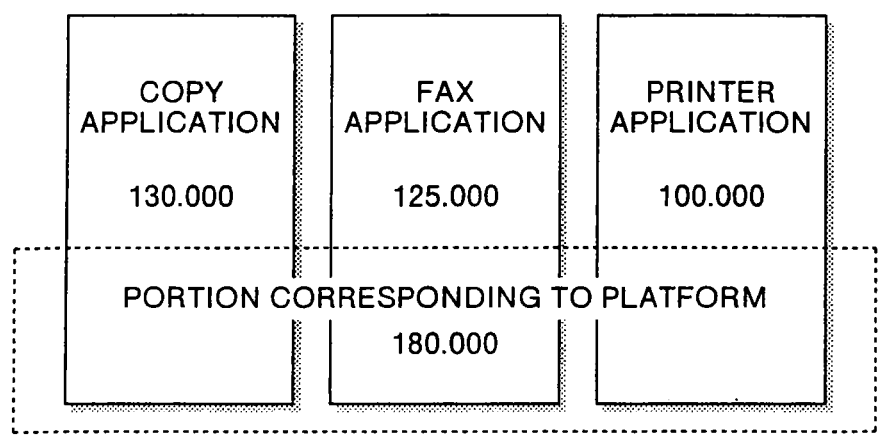
FIG. 2A and FIG. 2B are diagrams showing a platform shown in FIG. 1C.
Figure 2B:
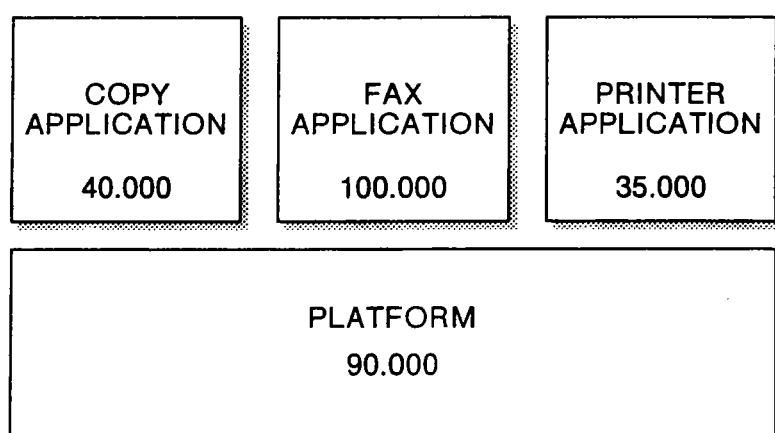

First of all, a concept of a compound machine according to a first embodiment will be explained by referring to FIG. 1A to FIG. 1C, FIG. 2A and FIG. 2B. FIG. 1A to FIG. 1C are diagrams showing a concept of a compound machine according to the first embodiment. FIG. 2A and FIG. 2B are diagrams showing a platform shown in FIG. 1C.

In a conventional printer 100, an application for printer (printer application) is mounted on a dedicated OS 101, which conducts a drawing and print function and engine control as shown in FIG. 1A. As for facsimile and copy as well, separate casings are formed. Further, a compound machine incorporating them on one casing has made its appearance. It is not efficient to simply provide functions of a printer, a copier, and a facsimile device independently of each other.

Therefore, an apparatus configuration as shown in FIG. 1B has been adopted. In this apparatus configuration, the conventional dedicated OS 101 is formed by a general purpose OS portion 111 and an engine control portion 112. The general purpose OS portion 111 and the engine control portion 112 are coupled by an engine interface (I/F). In addition, a printer application 113, a copy application 114, and various applications 115 are mounted on the general purpose OS 111.

In such a compound machine 110, a general purpose OS such as UNIX is adopted. Therefore, the printer application 113, the copy application 114 and the various applications 115 can be executed in parallel simply as processes.

In this compound machine 110 as well, however, the printer application 113, the copy application 114 and various applications 115 need to be developed independently of each other. Therefore, burdens of developing respective software programs cannot be reduced so much.

In a compound machine 120 according to the present embodiment, therefore, a common portion of respective applications is extracted as common system service 121 as shown in FIG. 1C. A platform 122 is formed by the common system service 121 and the general purpose OS 111.

Moreover, since the printer application 123, the copy application 124 and the various applications 125 are mounted on the platform 122, labor for developing respective applications can be reduced and the applications can be made slim.

For example, it is now assumed that a copy application has codes of 130,000 steps, a fax application has codes of 125,000 steps, and a printer application has codes of 100,000 steps as shown in FIG. 2A. If in this case they are formed separate applications, codes of a total of 130,000+125,000+100,000=355,000 steps are needed.

If portions that can be utilized in common for respective applications have 180,000 steps, the productivity is improved by putting together the portions as a platform.

For example, if it is assumed that the copy application, the fax application, the printer application, and the platform can be formed by codes of 40,000 steps, 100,000 steps, 35,000 steps, and 90,000 steps, respectively, as shown in FIG. 2B, then the total becomes 40,000+100,000+35,000+90,000= 265,000 steps. The productivity of the apparatus as a whole is improved to 134% (=355,000/265,000).

As for the platform portion, the productivity is improved to 200% (=180,000/90,000). In addition, development efficiencies of the copy application, the fax application, and the printer application are also improved remarkably.

The compound machine 120 according to the present embodiment is thus formed so as to mount the printer application 123, the copy application 124 and the various applications 125 on the platform 122 comprised of the common system service 121 and the general purpose OS 111. Therefore, both the productivity of the whole apparatus and the development efficiencies of respective applications can be increased.

A software configuration of the compound machine 120 shown in FIG. 1C will now be explained in more detail. FIG.

3 is a configuration diagram showing a concrete software configuration of the compound machine 120 shown in FIG. 1C.

Figure 3:
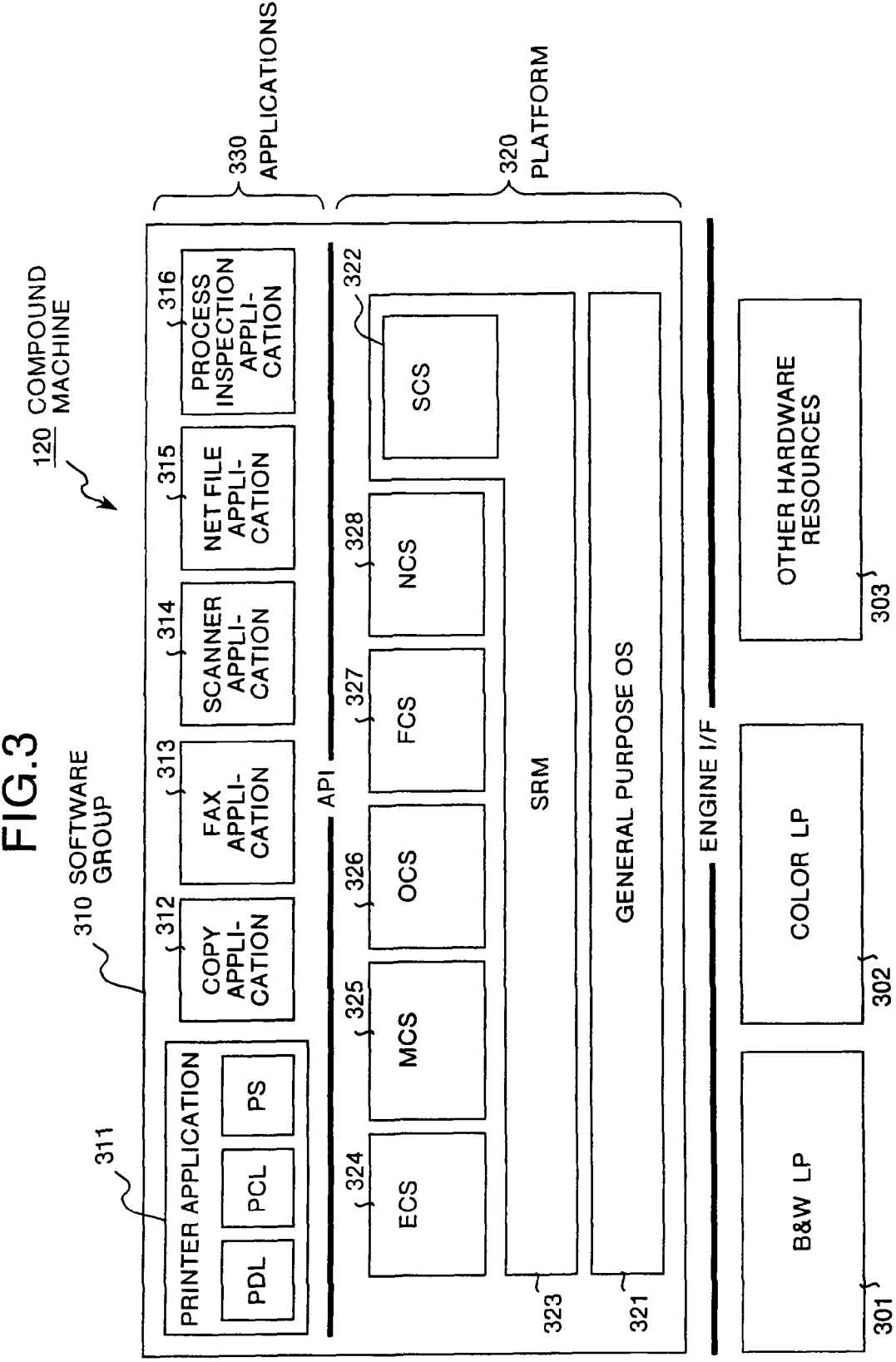
FIG. 3 is a configuration diagram showing a concrete configuration of a compound machine shown in FIG. 1C.

As shown in FIG. 3, the compound machine 120 includes a black and white line printer (B&W LP) 301, a color line printer (Color LP) 302, and other hardware resources 303. In addition, a software group 310 includes a platform 320 and applications 330.

The platform 320 includes control service, a system resource manager (SRM) 323, and a general purpose OS 321. The control service explained below interprets a processing request issued by the applications 330 and generates an acquisition request of hardware resources. The system resource manager 323 manages one or more hardware resources and arbitrates between acquisition requests from the control service.

The control service includes a plurality of service modules. To be concrete, the control service includes SCS (system control service) 322, ECS (engine control service) 324, MCS (memory control service) 325, OCS (operation panel control service) 326, FCS (FAX control service) 327, and NCS (network control service) 328. By the way, the platform 320 includes an application program interface, which enables reception of a processing request from the application by using a previously defined function.

The general purpose OS 321 is a general purpose operating system such as UNIX, and executes software programs of the platform 320 and the applications 330 in parallel respectively as processes. By using open source UNIX, the safety of the programs can be ensured and correspondence to the network becomes possible, and the source code can be obtained easily. In addition, the royalty of the OS and TCP/IP is unnecessary, and outsourcing also becomes easy.

The SRM 323 conducts system control and resource management in cooperation with the SCS 322. In accordance with a request from a high order layer utilizing hardware resources of an engine such as a scanner portion or a printer portion, a memory, an HDD file, and a host I/O (such as a Centro-I/F, a network I/F, an IEEE 1394 I/F, and an RS 232C I/F), the SRM 323 conducts arbitration and execution control.

To be concrete, the SRM 323 determines whether requested hardware resources are available (whether the requested hardware resources are not utilized by other requests). If available, the SRM 323 notifies a high order layer that the requested hardware resources are available. Further, the SRM 323 may conduct utilization scheduling of hardware resources in response to a request from a high order layer, and directly carry out request contents (for example, such as paper conveyance and image formation operation, memory insurance, file generation).

The SCS 322 conducts (1) application management, (2) operation portion control, (3) system screen display (such as job list screen and counter display screen), (4) LED display, (5) resource management, and (6) interrupt application control. To be concrete, (1) in application management, registration of an application and processing of notifying its information to another application are conducted. As for the application which has been registered, an engine state is notified to the application according to the system setting and request setting from an application. Further, as for applications already registered, an enquiry as to whether system state transition is possible, such as enquiry of power mode shift or an interrupt mode, is conducted.

Further, (2) in operation section control, exclusive control of the right of using the operation section of an application is conducted. Moreover, key information from an operation section driver (OCS) is notified exclusively to an application having the right of using the operation section. This key information conducts mask control of temporarily stopping notification according to the state transition of the system such as during application switchover.

Further, (3) in the system screen display, an alarm screen corresponding to the engine state is displayed according to a request content from an application having the right of using the operation section. Among them, there is one that turns on/off alarm display according to the application state such as a user restriction screen. Other than the engine state, there is conducted display control of a job list screen for displaying a job reservation and execution situation, a counter screen for displaying total counters, and a screen indicating that the CSS is being notified. As for the system screen displays of them, the application is not requested to release the right of using the operation section and drawing is conducted as a system screen covering the application screen.

Further, (4) in LED display, display control of a system LED, such as an alarm LED or an application key, is conducted. As for an LED peculiar to an application, the application controls it by directly using a display driver.

Further, (5) in resource management, there is conducted service for exclusive control of engine resources (such as a scanner and a staple) that must be excluded when an application (ECS) executes a job. (6) In interrupt application control, there are conducted control and service for causing a specific application to operate preferentially.

The ECS 324 controls an engine such as the black and white line printer (B&W LP) 301, the color line printer (Color LP) 302, and the other hardware resource 303. The ECS 324 conducts image reading, print operation, state notification, jam recovery, and so on.

To be concrete, a series of copy/scan/print operations are implemented by successively issuing print requests to the SRM 323 in accordance with job mode specification received from the applications 330. Subject jobs handled by the ECS 324 are jobs with a scanner specified as an image input device or jobs with a plotter specified as an image output device.

For example, in the case of copy operation, "SCANNER.fwdarw.PLOTTER" is specified. In the case of file storage, "SCANNER.fwdarw.MEMORY" is specified. In the case of facsimile transmission, "SCANNER.fwdarw.FAX_IN" is specified. In the case of stored file print or print from the printer application 311, "MEMORY.fwdarw.PLOTTER" is specified. In the case of facsimile reception, "FAX_OUT.fwdarw.PLOTTER" is specified.

Although the definition of job differs depending upon application, processing operation for one set of images handled by the user is herein defined as one job. For example, in the case of an ADF (automatic document feeder) mode of copy, operation of reading one set of manuscripts put on a manuscript stand becomes one job. In a pressure plate mode, reading operation conducted as far as the final manuscript is fixed becomes one job. In the case of the copy application 312, operation of copying one bundle of manuscripts becomes one job. In the case of the fax application 313, transmission operation of one document or reception operation of one document becomes one job. In the case of the printer application, print operation of one document becomes one job.

The MCS 325 conducts memory control. To be concrete, the MCS 325 conducts acquisition and release of an image memory, utilization of a hard disk device (HDD), and image data compression and expansion.

As functions required to manage information needed as image data files stored in the hard disk device, there are (1) file access (generation/deletion/open/close) function (including exclusive processing), (2) management of various file attributes (management of image data of physical page units as files) such as file name/ID management (file/user)/password management/storage time management/the number of pages/data format (such as compression system)/access restriction/generating application/print condition management, (3) jointing/insertion/disconnection function by taking a file as the unit and taking a page as the unit, (4) file sort function (in the order of storage time/in the order of user ID or the like), (5) notification of all file information (for display/retrieval), (6) recovery function (file/page discard of a damaged file), and (7) automatic file deletion function.

As functions for retaining image data in a memory such as a RAM and accessing the image data, there are (1) a function of acquiring file and page/band attribute information from the applications 330, and (2) functions of securing, releasing, reading and writing an image data area from the applications 330.

The OCS 326 is a module for controlling an operation panel which serves as information transfer means between the operator and main body control. The OCS 326 conducts processing of notifying a key operation event of the operator to the main body control, processing of providing a library function for each application to construct a GUI, processing of managing the constructed GUI information application to application, and display reflection processing onto an operation panel.

The OCS 326 has (1) a library providing function for GUI construction, (2) an operation section hardware resource management function, (3) VRAM drawing/LCD display function (hardware display, display application switchover, display language switchover, window dark color display, message/icon blink display, message joint display), (4) hard key input detection function, (5) touch panel key input detection function, (6) LED output function, (7) buzzer output function.

The FCS 327 provides an API for conducting facsimile transmission and reception using a PSTN/ISDN network, registration/citation of various facsimile data managed by BKM (backup SRAM), facsimile reading, facsimile reception print, and fused transmission and reception, from each application layer of a system controller.

To be concrete, the FCS 327 has (1) a transmission function of transmitting a document requested to be transmitted by an application layer, to a facsimile receiver by using a PSTN/ISDN network, (2) reception function of transferring and printing a facsimile reception screen and various reports received from the PSTN/ISDN network, (3) telephone directory citation and registration function of conducting citation and/or registration of facsimile management items such as a telephone directory and group information stored in a fax board, (4) a fax log notification function of notifying transmission and reception result history information stored in the BKM mounted on a fax board to an application which needs it, and (5) an event notification function of notifying a changed event to an application registered in the FCS when there has been a state change of the fax board.

The NCS 328 is a group of modules for providing applications needing a network I/O with service which can be utilized in common. The NCS 328 distributes data received from the network side by using each protocol among applications, and acts as an intermediary when an application transmits data to the network side. To be concrete, the NCS 328 has server demons such as ftpd, httpd, lpd, snmpd, telnetd, and smtpd, and client functions of the same protocol.

The applications 330 includes a printer application 311, which is an application for printer having a page description language (PDL), a PCL and a post script (PS), a copy application 312, which is an application for copy, a fax application 313, which is an application for facsimile, a scanner application 314, which is an application for scanner, a net file application 315, which is an application for net file, and a process inspection application 316, which is an application for process inspection. Since each of the applications 311 to 316 can execute operation by utilizing processes on the platform 320, a screen display control program, which conducts screen control, key operation control, and job generation, forms its main constituent. A new application may also be mounted via a network connected by the NCS 328. Applications can be added or deleted application by application.

Copy operation using the copy application 312, print operation using the printer application 311, and scanner operation using the scanner application 314 shown in FIG. 3 will now be explained further concretely.

Figure 4:
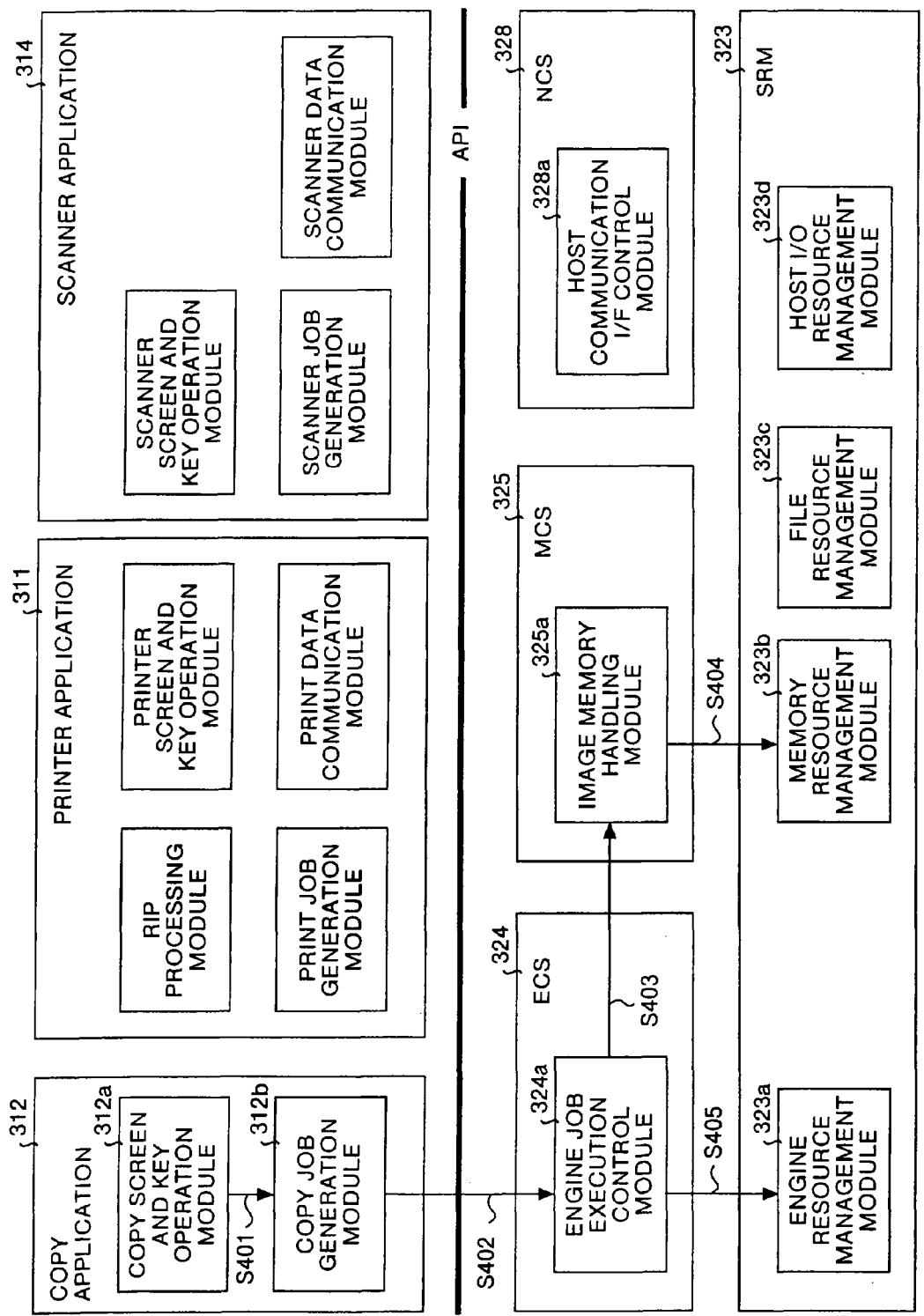
FIG. 4 is a diagram showing copy operation using a copy application shown in FIG. 3.

FIG. 4 is a diagram showing copy operation using the copy application 312 shown in FIG. 3. As shown in FIG. 4, the copy application 312 has a copy screen and key operation module 312a and a copy job generation module 312b. If a copy condition is specified from an operation panel and a start key is depressed, then the copy screen and key operation module 312a transfers the copy condition to the copy job generation module 312b (step S401). The copy condition includes paper size, the number of copies, both sides, sort, and staple.

Thereafter, the copy job generation module 312b calls an engine job generation function of an engine job execution control module 324a by using an API of the ECS 324, and sets a job mode. Such a job mode is a group of parameters required to activate a scanner, a plotter, a finisher, or the like, and it is generated from the copy condition. In addition, the copy job generation module 312b calls a job execution start function of the engine job execution control module 324a by using an API of the ECS 324, and orders job execution (step S402).

The engine job execution control module 324a calls an image memory insurance function of an image memory handling module 325a by using an API of the MCS 325, and orders insurance of an image memory (step S403).

The image memory handling module 325a calls a memory acquisition function of a memory resource management module 323b of the SRM 323, and acquires a memory (step S404). The engine job execution control module 324a calls a resource acquisition function of an engine resource management module of the SRM 323, starts operation of a scanner and a plotter, and executes a copy job.

Figure 5:
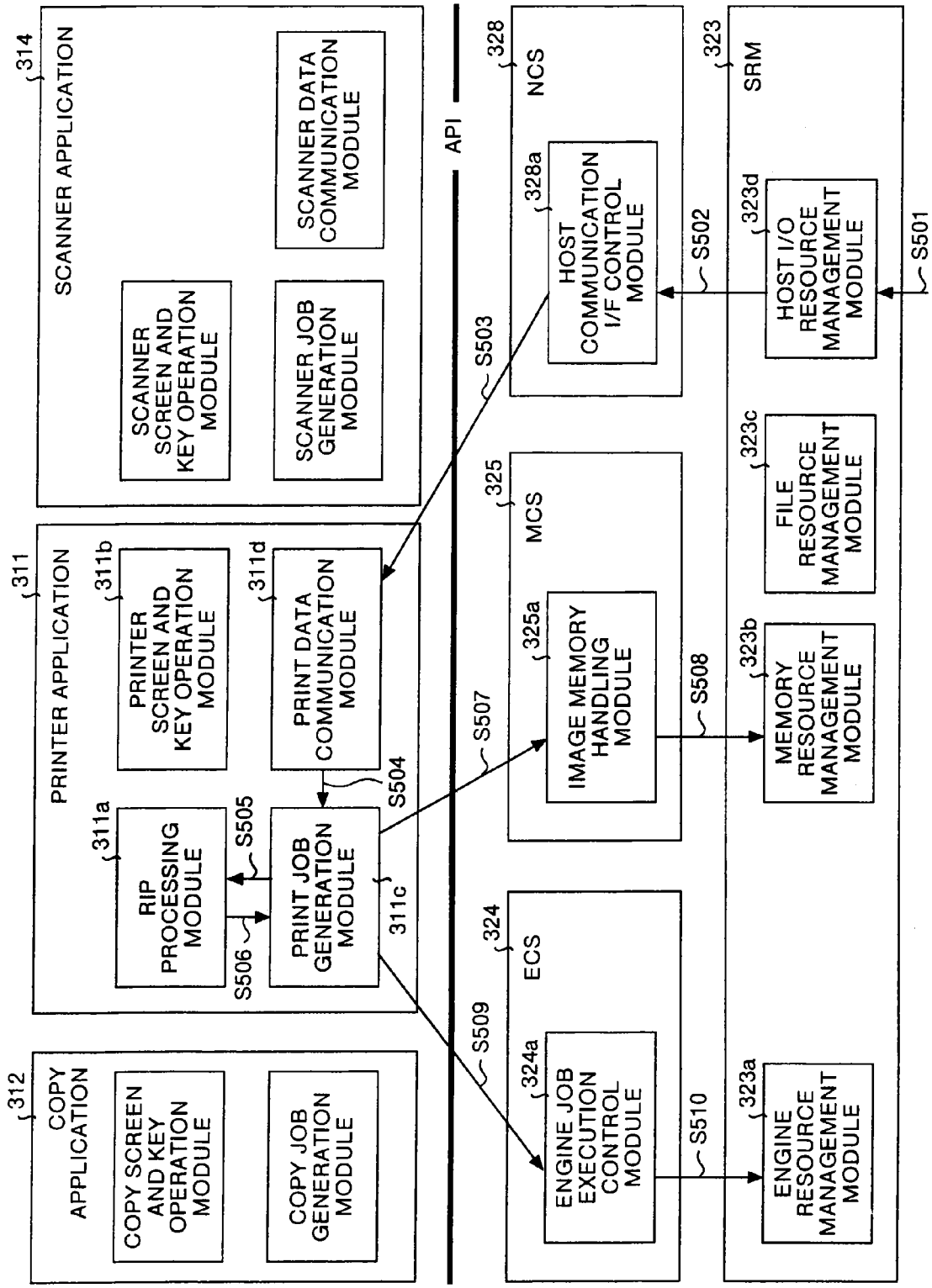
FIG. 5 is a diagram showing print operation using a printer application shown in FIG. 3.

Print operation using the printer application 311 shown in FIG. 3 will now be explained more concretely. FIG. 5 is a diagram showing print operation using the printer application 311 shown in FIG. 3. As shown in FIG. 5, the printer application 311 includes an RIP processing module 311a, a printer screen and key operation module 311b, a print job generation module 311c, and a print data communication module 311d.

If a print data command from a host such as a PC is input to a host I/O resource management module 323d of the SRM 323 via a centro I/F, a USB I/F, a network I/F and so on (step S501), then the I/O resource management module 323d transfers the print data to a host communication I/F control module 328a of the NCS 328. The host communication I/F control module 328a analyzes the input print data, and judges a destination application. The host communication I/F control module 328a receives data from a plurality of communication protocols or host I/Fs, and arbitrates a destination (step S502).

If print data is transferred to the print data communication module 311d in the printer application 311 (step S503), then the print data is further input to the print job generation module 311c and a new print job is generated (step S504).

The print job generation module 311c transfers data to the RIP processing module 311a according to the language kind of the print data (step S505). The RIP processing module 311a conducts image development of the print data, and thereafter returns its result to the print job generation module 311c (step S506).

Image data generated by the print job generation module 311c is output to the image memory handling module 325a of the MCS 325 (step S507). Requests to the image memory are generated by a plurality of applications. Therefore, a memory insurance request is issued to the memory resource management module 323b of the SRM 323, which arbitrates memory resources. The image data developed after being acquired is written onto a memory (step S508).

If print preparation of the image data is completed, then the print job generation module 311c calls an engine job generation function of the engine job execution control module 324a by using the API of the ECS 324, conducts job mode setting, then calls a job start function, and orders job execution (step S509).

The engine job execution control module 324a calls an engine resource acquisition function of an engine resource management module 323a of the SRM 323, starts plotter operation, and executes a print job (step S510).

Figure 6:
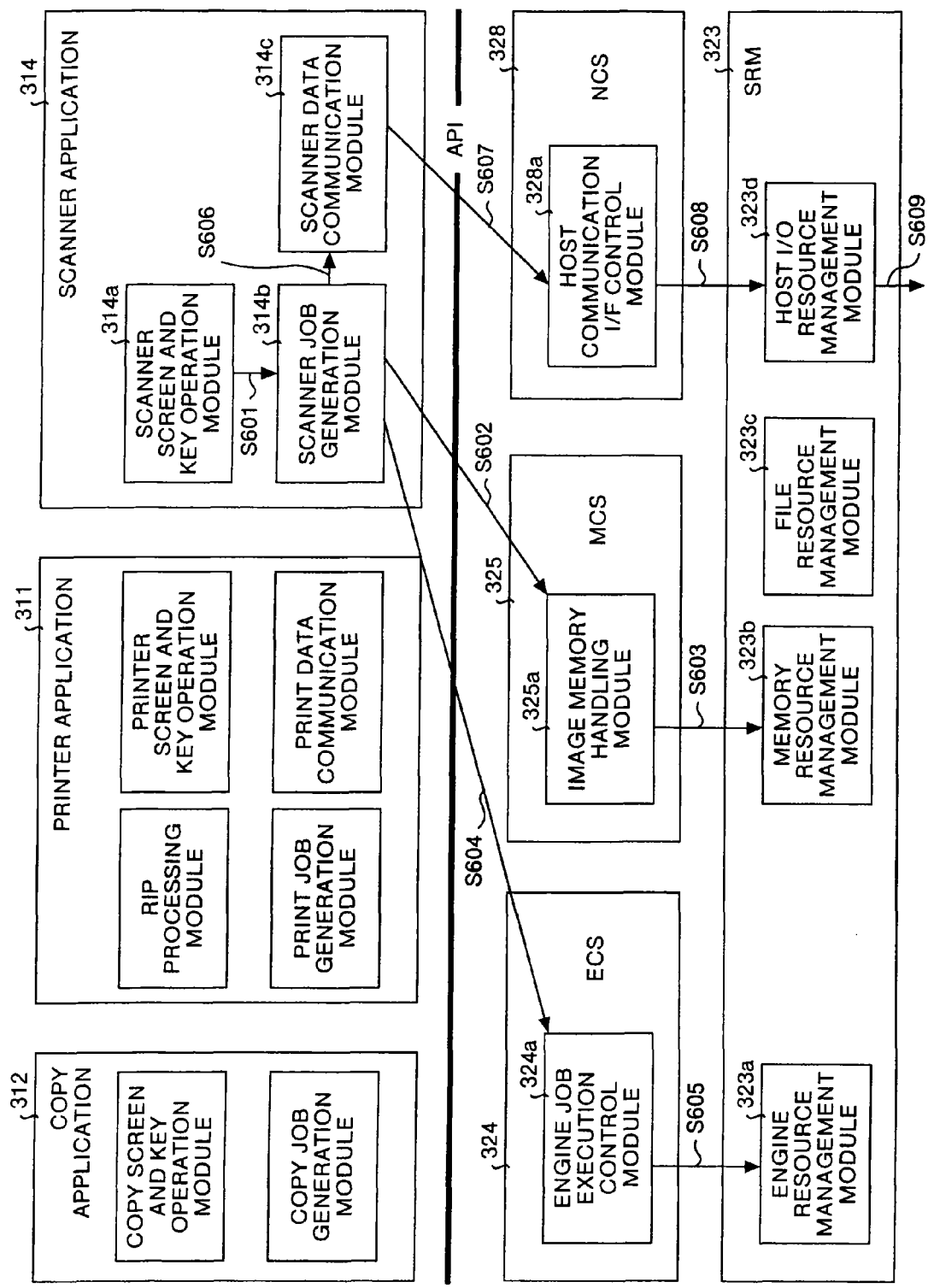
FIG. 6 is a diagram showing scanner operation using a scanner application shown in FIG. 3.

The scanner operation using the scanner application 314 shown in FIG. 3 will be explained further concretely. FIG. 6 is a diagram showing the scanner operation using the scanner application 314 shown in FIG. 3. As shown in FIG. 6, the scanner application 314 includes a scanner screen and key operation module 314a, a scanner job generation module 314b, and a scanner data communication module 314c.

On the operation panel, the scanner application 314 is selected, a scan condition is input, and the start key is depressed. Thereupon, the scanner screen and key operation module 314a transfers the scan condition to the scanner job generation module 314b (step S601). The scanner job generation module 314b activates the image memory handling module 325a. In order to ensure a memory required for scan in accordance with a requested image size, the image memory handling module 325a of the MCS 325 issues a memory insurance request to the memory resource management module 323b of the SRM 323, which conducts arbitration of memory resources. After a memory has been acquired, image data is written on the memory (steps S602 and S603).

If scan preparation of image data is completed, then the scanner job generation module 314b calls the engine job generation function of the engine job execution control module 324a by using the API of the ECS 324, conducts job mode setting, then calls a job start function, and orders job execution (step S604).

The engine job execution control module 324a calls the engine resource acquisition function of the engine resource management module 323a of the SRM 323, starts scanner operation, and executes a scanner job (step S605).

The scanner job generation module 314b receives a scan completion event from the ECS 324. In order to transfer a read image to an external PC by utilizing host I/O resources such as a network, the scanner data communication module 314c sends an address of a transfer destination PC such as a URL and scanned image data (or an address on a memory) to the host communication I/F control module 328a of the NCS 328 (steps S606 and S607). Here, image data communication is controlled by using a protocol function for conducting file transfer, such as ftp or http.

In order to ensure host I/O resources, such as a network, IEEE 1394, USB, and SCSI, the host communication I/F control module 328a calls a resource insurance function of the host I/O resource management module 323d of the SRM 323 (step S608). At a time point when the requested host I/O resources have become available, the host I/O resource management module 323d conducts image data communication (step S609).

Figure 7:
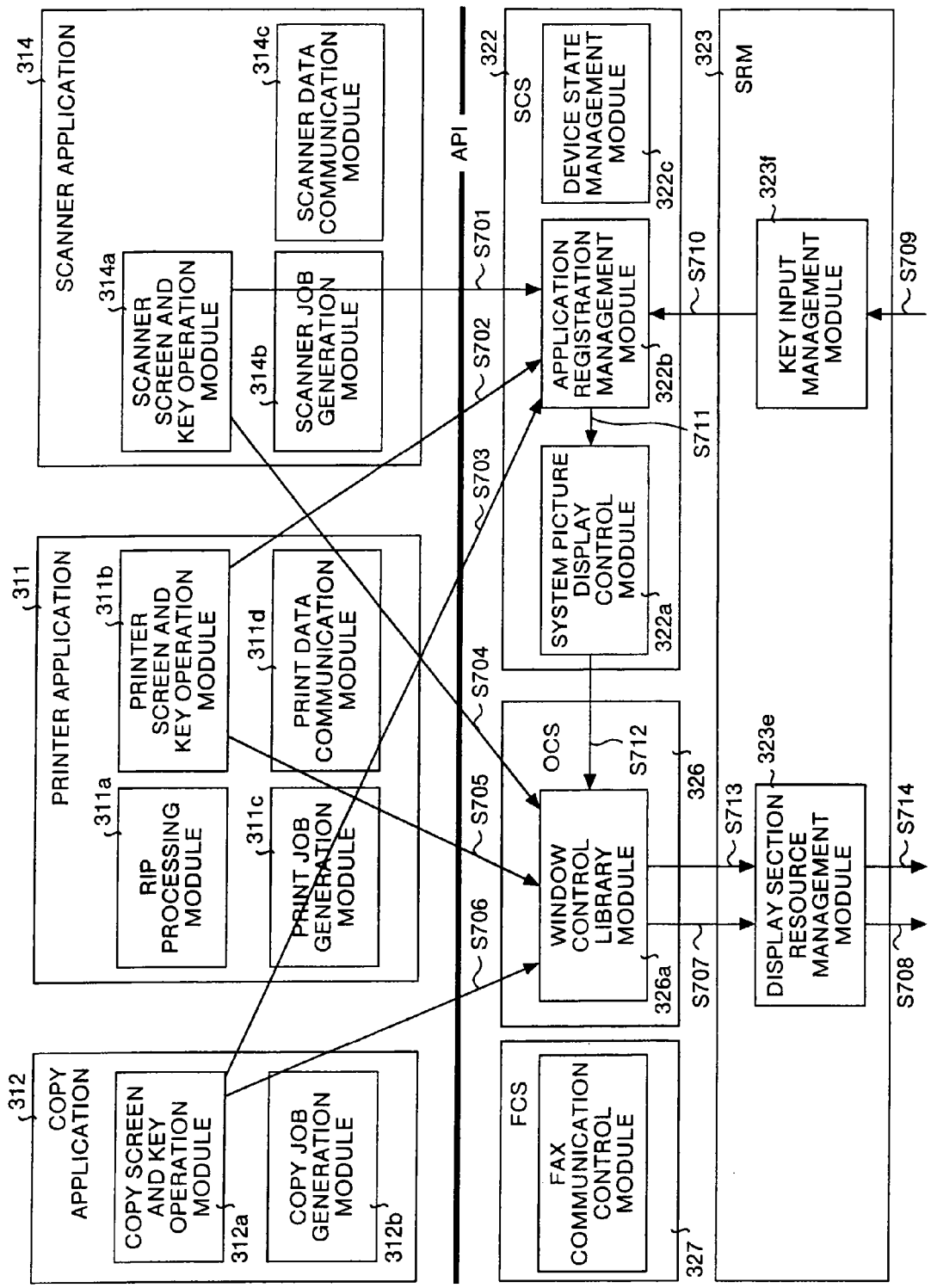
FIG. 7 is a diagram showing processing of a copy application, a printer application, and a scanner application at the time of start, processing of generating and displaying respective application screens, and processing conducted when an application screen selection key is depressed.

Processing conducted at the time of start of three applications: the copy application 312, the printer application 311 and the scanner application 314, processing for generating and displaying respective application screens, and processing conducted when an application screen selection key is depressed will now be explained. FIG. 7 is a diagram showing processing conducted at the time of start of three applications: the copy application 312, the printer application 311 and the scanner application 314, processing for generating and displaying respective application screens, and processing conducted when an application screen selection key is depressed.

Processing at the time of start of application: At the time of power on and system reset, an application is started after at least SCS 322 and OCS 326 have been started. The copy application 312, the printer application 311, or the scanner application 314 registers a fact that it has been started in an application registration management module 322b of the SCS 322 (steps S701 to S703).

Screen generation processing: The OCS 326 has such a drawing management function that each of a plurality of applications can have a plurality of virtual screen memories. Therefore, each of the copy application 312, the printer application 311, and the scanner application 314 can execute screen generation by using a window control library module 326a (steps S704 to S708).

Display processing: One of a plurality of screen memories is drawn on a display panel. A screen formed by combining contents of a plurality of screen memories may also be displayed. For example, in the case where fax reception has been conducted during copy operation, the fact that fax reception is being conducted can be displayed in a screen area common to applications.

Screen switchover processing: A screen memory drawn on the display panel is switched over by a system screen display control module of the SCS 322. For example, in the case where the application selection key on the operation panel is depressed, an application screen selected according to steps S709 to S714 is drawn. A device state management module 322c which holds state information of hardware within a device or an engine is included in the SCS 322. Therefore, a display screen at the time of an error or an abnormality such as a jam or paper absence can be switched over.

Figure 8:
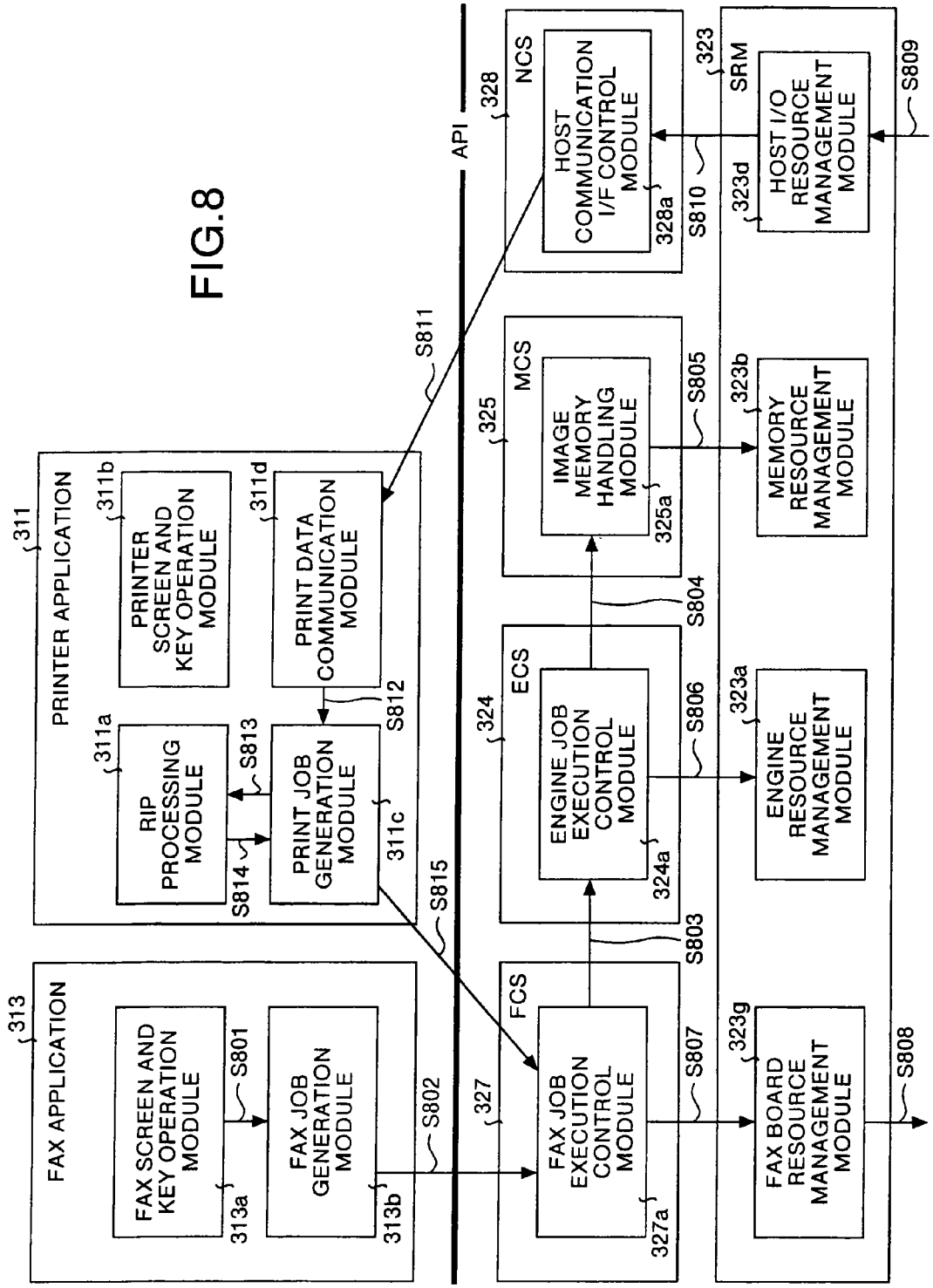
FIG. 8 is a diagram showing facsimile transmission operation using a facsimile application or a printer application.

Fax transmission operation using the fax application 313 or the printer application 311 will now be explained. FIG. 8 is a diagram showing fax transmission operation using the fax application 313 or the printer application 311.

By referring to FIG. 8, fax transmission operation using the fax application 313 will now be explained. On a fax operation screen, a transmission destination number is input and a start key is depressed. Thereupon, a fax screen and key operation module 313a calls a job generation function of a fax job generation module 313b (step S801). The fax job generation module 313b calls a transmission start function of a fax job execution control module 327a of the FCS 327 (step S802).

Thereupon, the fax job execution control module 327a calls the engine job generation function of the engine job execution control module 324a by using the API of the ECS 324, and sets a job mode (step S803). The engine job execution control module 324a calls an image memory insurance function of the image memory handling module 325a by using the API of the MCS 325, and orders insurance of an image memory (step S804).

The image memory handling module 325a calls the memory acquisition function of the SRM 323, and acquires a memory required to scan a fax manuscript (step S805). If a memory is secured, then the engine job execution control module 324a calls a function of requesting insurance of scanner resources, of the engine resource management module 323a of the SRM 323, and starts scanner operation after the scanner resources have been secured (step S806).

When manuscript image data from the scanner is retained on a memory, the ECS 324 notifies a scan completion event to the FCS 327. The fax job execution control module 327a calls a transmission start function of a fax board resource management module 323g. A fax transmission procedure is started by using a PSTN, an ISDN line, and so on (steps S807 and S808).

As for fax transmission operation using the printer application 311, print data is input to the host I/O resource management module 323d in the same way as the typical print operation. At that time, command information including information required for facsimile transmission, such as a transmission destination number, is added (step S809).

Print data for fax transmission is transferred from the host communication I/F control module 328a of the NCS 328 to the print job generation module 311c via the print data communication module 311d of the printer application 311 (steps S810 to S812). Thereupon, a new print job for fax transmission is generated.

Moreover, the print data is transferred to the RIP processing module 311a, and image data is generated. The image data is input to the fax job execution control module 327a of the FCS 327 together with information required for facsimile transmission (steps S813 to 815). Thereafter, processing similar to the fax transmission operation is conducted (steps S807 and S808).

Instead of conducting the RIP processing by using the steps S813 and S814, print data may be transmitted by means of a protocol (BFTP: binary file transfer protocol), which conducts transfer of binary data by using a PSTN, an ISDN line, and so on.

For convenience of explanation, only transmission operation has been explained. For example, however, fax reception and printing become possible by conducting processing in the order of steps S808, S807, S802, S803, S804, S805 and S806. Reception and printing of printing data using the BFTP can be implemented by conducting processing in the order of steps S808, S807, S802, S815, S813, S814, S815, S803, S804, S805 and S806.

Figure 9:
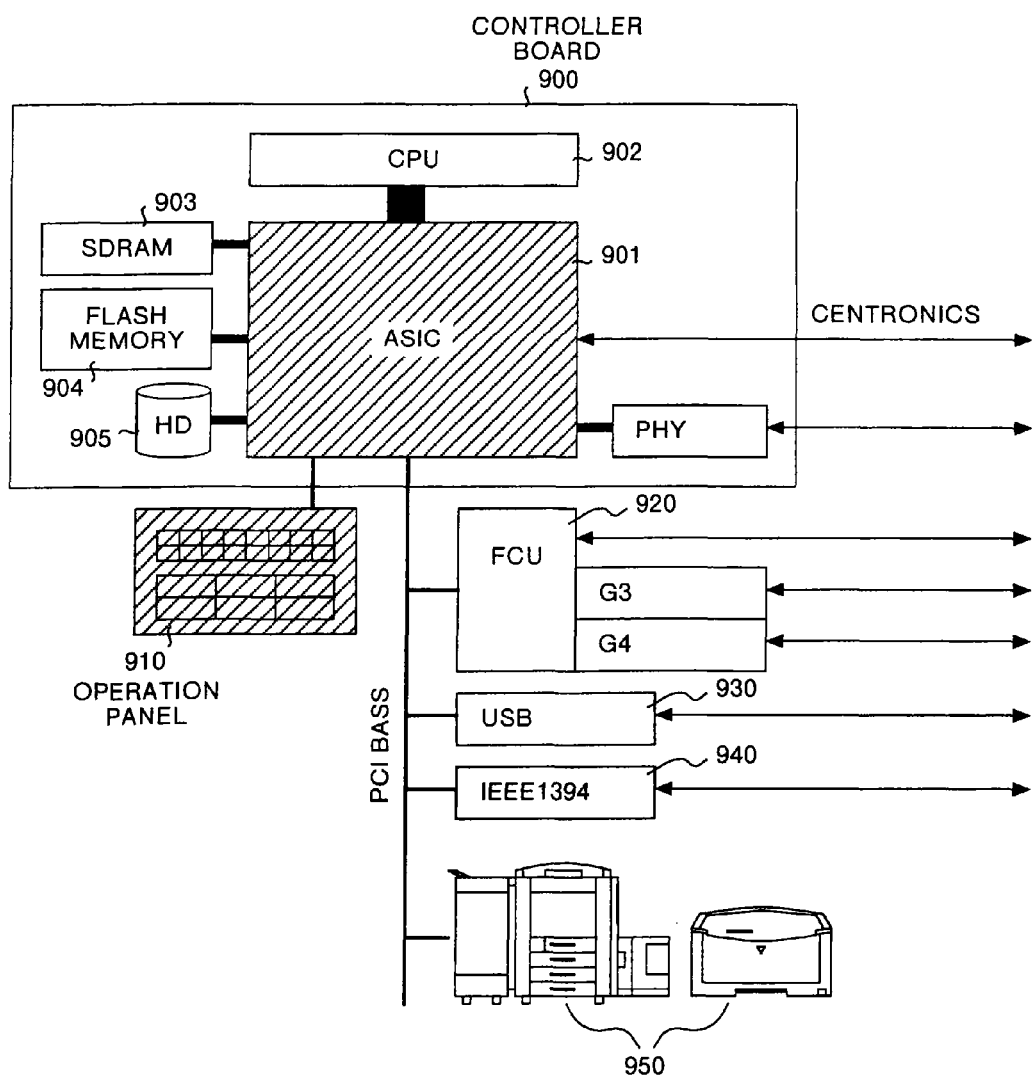
FIG. 9 is a configuration diagram showing a hardware configuration of a compound machine shown in FIG. 1C.

A hardware configuration of the compound machine 120 shown in FIG. 1 will now be explained. FIG. 9 is a configuration diagram showing a hardware configuration of the compound machine 120 shown in FIG. 1. As shown in FIG. 9, the compound machine 120 includes a controller board 900. In the controller board 900, a CPU 902, an SDRAM 903, a flash memory 904, and an HD 905 are connected to an ASIC 901. The compound machine 120 includes an operation panel 910, a fax control unit (FCU) 920, a USB 930, an IEEE 1394 940, and a printer 950.

The operation panel 910 is connected directly to the ASIC 901. The FCU 920, the USB 930, the IEEE 1394 940, and the printer 950 are connected to the ASIC 901 via a PCI bus.

Figure 10:
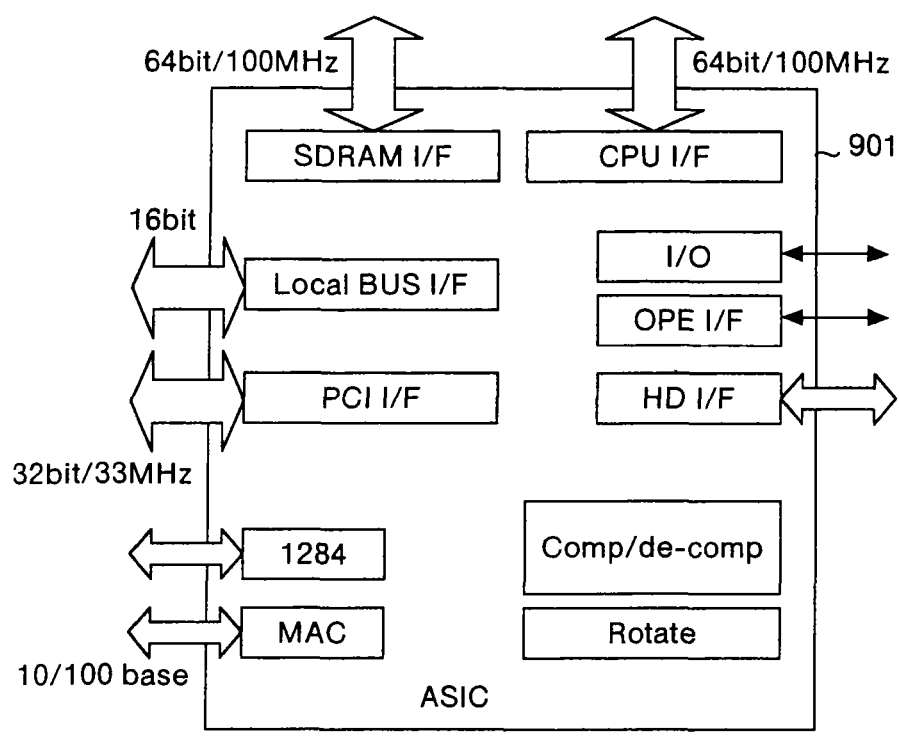
FIG. 10 is a block diagram showing a detailed configuration of an ASIC shown in FIG. 9.

FIG. 10 is a block diagram showing a detailed configuration of the ASIC 901 shown in FIG. 9. As shown in FIG. 10, the ASIC 901 includes a CPU interface (CPU I/F), an SDRAM interface (SDRAM I/F), a local bus interface (Local BUS I/F), a PCI interface (PCI I/F), a 1284, an MAC (media access controller), an I/O, an OPE interface (OPE I/F), an HD interface (HD I/F), a Comp/de-comp, and a Rotate.

By adopting such a hardware configuration, a low cost design owing to device sharing becomes possible and fusion between applications becomes easy. An architecture which is scalable from a low speed machine to a high speed machine is obtained. Hardware/software used in applications is made common. The development efficiency can be improved. It becomes easy to cope with a novel function.

As heretofore described, the first embodiment is formed so as to extract the common part of applications as the common system service 121, form the platform 122 by using the common system service 121 and the general purpose OS 111, and mount the printer application 123, the copy application 124, and the various applications 125 on the platform 122. Therefore, the development labor of each application can be reduced, and applications can be made slim.

The present invention is not limited to the first embodiment. It is also possible to hierarchize software on the platform 320 and the application 330, and further increase the productivity. As a second embodiment, the case where the software on the platform 320 and the application 330 is hierarchized will be explained. Since a hardware configuration in this case becomes similar to that of FIGS. 9 and 10, explanation thereof will be omitted.

Figure 11:
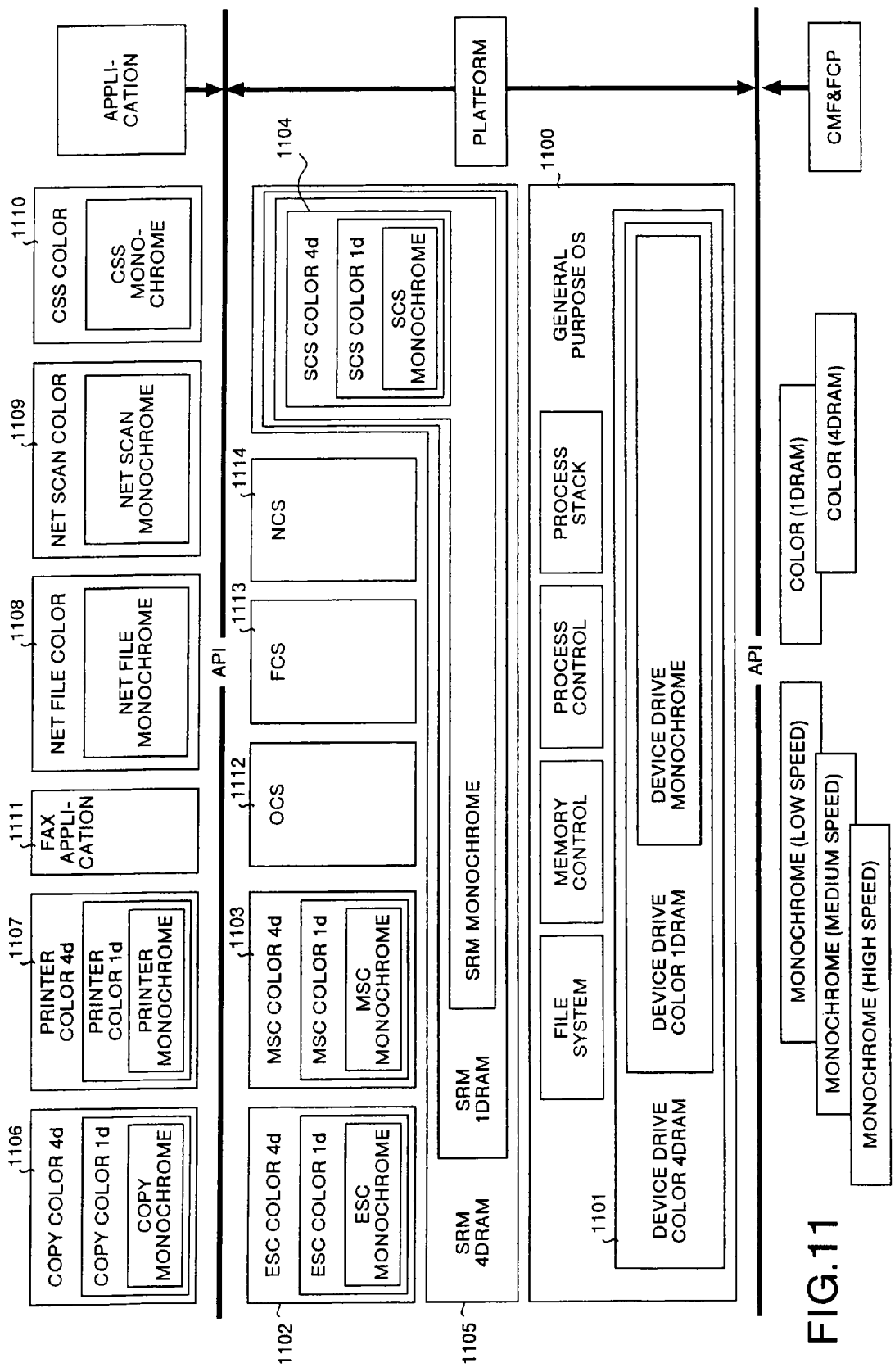
FIG. 11 is a block diagram showing a software configuration of a compound machine according to a second embodiment of the present invention.

FIG. 11 is a block diagram showing a software configuration of a compound machine according to the second embodiment. In this compound machine, software elements are hierarchized according to the distinction between monochrome and color and the number of color drums, as shown in FIG. 11.

To be concrete, each of a device driver 1101 on a general purpose OS 1100, an ESC 1102, an MCS 1103, an SCS 1104, an SRM 1105, a copy application 1106, and a printer application 1107 is hierarchized to monochrome, 1 dram and 4 dram.

A net file application 1108, a net scan application 1109, and a CSS application 1110 are hierarchized to monochrome and color. However, a fax application 1111, an OCS 1112, an FCS 1113 and an NCS 1114, which need not be discriminated between monochrome and color, are not hierarchized.

As heretofore described, the second embodiment is formed so as to hierarchize software elements according to the distinction between monochrome and color and the number of color drums. Therefore, the productivity of the platform and applications can be increased.

In the second embodiment, software elements are hierarchized according to the distinction between monochrome and color and the number of color drums. However, the present invention is not limited to this, but it is also possible to hierarchize the platform itself to many classes. In this case, a part which depends on hardware such as an engine becomes a lower class, and a part which does not depend on hardware becomes a higher class.

As heretofore explained, an image formation apparatus according to one aspect of this invention includes: applications each of which conducts processing peculiar to user service such as print, copy, or facsimile and which can be mounted in a plurality on the image formation apparatus; and a platform which is interposed between the applications and the hardware resources, and which conducts management of the hardware resources, execution control and image formation processing needed in common by at least two of the applications when providing the user service. When creating an application of each user service, therefore, only portions other than the platform need to be created. As a result, the burden of creating the applications can be reduced.

Further, an application program interface which enables reception of a processing request from the applications by using a predefined function is provided in the platform.

Therefore, smooth cooperation between the applications and the platform can be maintained.

Further, there are provided in the platform, control service which interprets a processing request from the applications and causes an acquisition request of the hardware resources to be generated; and a system resource manager which manages one or more hardware resources and arbitrates between acquisition requests from the control service. Therefore, each application can utilize hardware resources smoothly.

Further, the control service includes a plurality of service modules. Therefore, function expansion or function modification of the platform can be implemented in the module level.

Further, the service modules include modules of at least two from among engine control service which controls an engine, memory control service which controls a memory and a hard disk, operation panel control service which controls an operation panel, fax control service which controls fax communication, and network control service which controls network communication. Therefore, the engine control, memory control, operation panel control, fax communication control, or network communication control can be conducted by using the platform.

Further, the service modules include at least network control service which controls network communication, and the applications are acquired and mounted via a network connected by the network control service. Therefore, a new application can be mounted efficiently via an external network.

Further, the platform further includes a general purpose operating system, and the system resource manager manages one or more hardware resources via the general purpose operating system. Therefore, the hardware resources can be managed efficiently by process execution under the general purpose operating system.

Further, applications can be added or deleted application by application. Therefore, the function of the image formation apparatus can be optimized in a form desired by the user.

Further, applications conduct screen control, key operation control and job generation relating to services of print, copy and facsimile. Therefore, various kinds of processing can be implemented by using a simple application which conducts processing relating to such a user interface.

Further, a plurality of applications include at least printer application, copy application, fax application, scanner application, net file application, and process inspection application. Therefore, the user can use the printer, copy, fax, scanner, net file, and process inspection.

According to another aspect of this invention, processing peculiar to user service such as print, copy, or facsimile is conducted by using applications which can be mounted in a plurality; and management of the hardware resources, execution control and image formation processing needed in common by at least two of the applications is conducted, when providing the user service, by using a platform interposed between the applications and the hardware resources. When creating an application of each user service, therefore, only portions other than the platform need to be created.

According to still another aspect of this invention, each of the application programs is executed to operate on a platform which conducts management of the hardware resources, execution control and image formation processing, when providing user service such as print, copy, or facsimile. Therefore, application programs each having a reduced processing burden by using the platform can be provided.

A concept of a compound machine according to a third embodiment will be explained by referring to FIG. 12A to FIG. 12C and FIG. 2A and FIG. 2B. FIG. 12A to FIG. 12C are diagrams showing a concept of a compound machine according to the third embodiment. FIG. 2A and FIG. 2B are diagrams showing a platform shown in FIG. 12C.

In a conventional printer 100, an application for printer (printer application) is mounted on a dedicated OS 101, which conducts a drawing and print function and engine control as shown in FIG. 12A. As for facsimile and copy as well, separate casings are formed. Further, a compound machine incorporating them on one casing has made its appearance. It is not efficient to simply provide functions of a printer, a copier, and a facsimile device independently of each other.

Therefore, an apparatus configuration as shown in FIG. 12B has been adopted. In this apparatus configuration, the conventional dedicated OS 101 is formed by a general purpose OS portion 111 and an engine control portion 112. The general purpose OS portion 111 and the engine control portion 112 are coupled by an engine interface (I/F). In addition, a printer application 113, a copy application 114, and various applications 115 are mounted on the general purpose OS 111.

In such a compound machine 110, a general purpose OS such as UNIX is adopted. Therefore, the printer application 113, the copy application 114 and the various applications 115 can be executed in parallel simply as processes.

In this compound machine 110 as well, however, the printer application 113, the copy application 114 and various applications 115 need to be developed independently of each other. Therefore, burdens of developing respective software programs cannot be reduced so much.

In a compound machine 120 according to the present third embodiment, therefore, a common portion of respective applications is extracted as common system service 121a and application service 121b as shown in FIG. 12C. A platform 122 is formed by the common system service 121a, the application service 121b and the general purpose OS 111.

Especially in the compound machine 120, the application service 121b is adapted to be interposed between the applications 123 to 125 and the common system service 121a, and thereby the application service 121b conducts collectively job generation and data communication which should be originally by the applications 123 to 125 independently of each other. Therefore, labor for developing respective the printer application 123, the copy application 124 and the various applications 125 mounted on the platform 122 can be reduced, and the applications can be made slim.

For example, it is now assumed that a copy application has codes of 130,000 steps, a fax application has codes of 125,000 steps, and a printer application has codes of 100,000 steps as shown in FIG. 2A. If in this case they are formed separate applications, codes of a total of 130,000+125,000+100,000= 355,000 steps are needed.

If portions that can be utilized in common for respective applications have 180,000 steps, the productivity is improved by putting together the portions as a platform.

For example, if it is assumed that the copy application, the fax application, the printer application, and the platform can be formed by codes of 40,000 steps, 100,000 steps, 35,000 steps, and 90,000 steps, respectively, as shown in FIG. 2B, then the total becomes 40,000+100,000+35,000+90,000= 265,000 steps. The productivity of the apparatus as a whole is improved to 134% (=355,000/265,000).

As for the platform portion, the productivity is improved to 200% (=180,000/90,000). In addition, development efficiencies of the copy application, the fax application, and the printer application are also improved remarkably.

The compound machine 120 according to the present third embodiment is thus formed so as to mount the printer application 123, the copy application 124 and the various applications 125 on the platform 122 comprised of the application service 121b, the common system service 121a and the general purpose OS 111. Therefore, both the productivity of the whole apparatus and the development efficiencies of respective applications can be increased.

Figure 12:
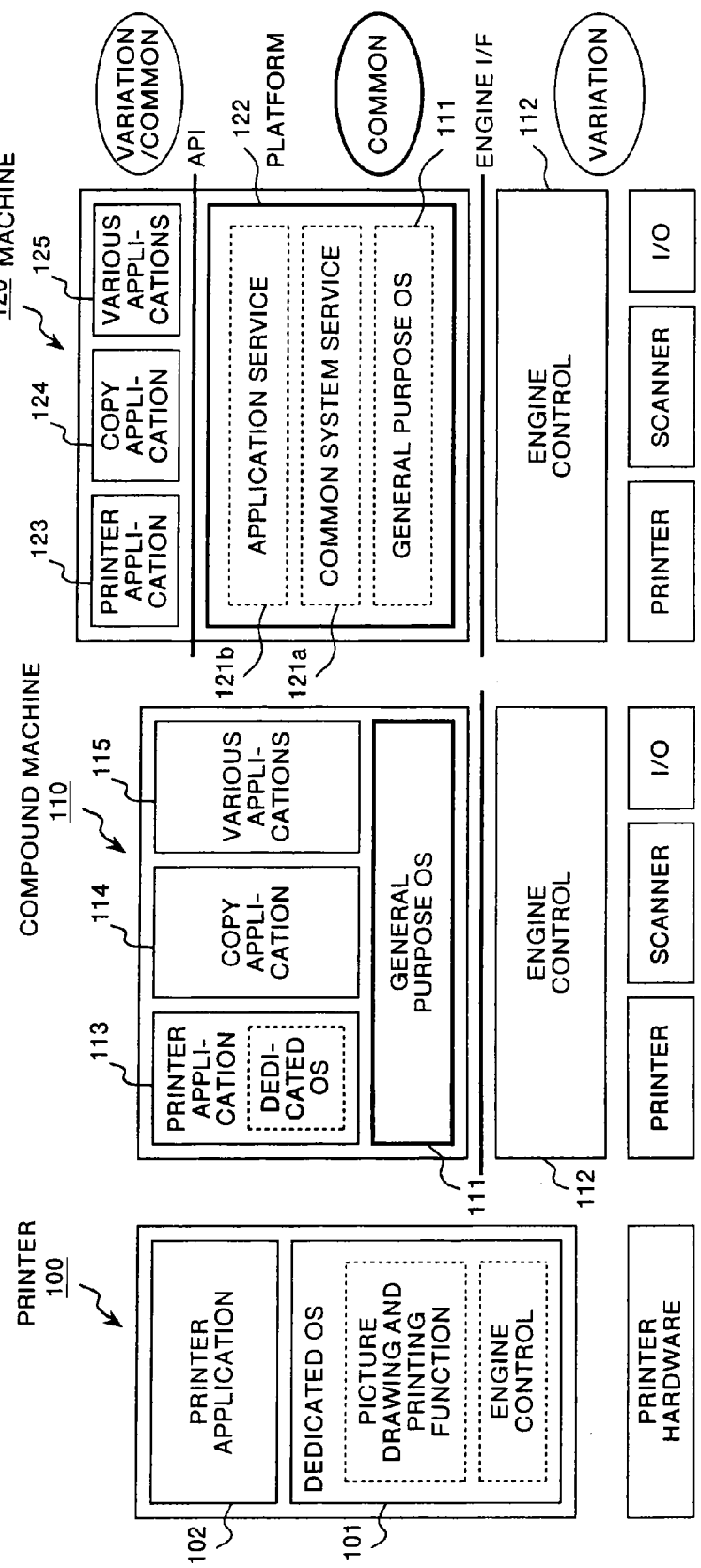
FIG. 12A to FIG. 12C are diagrams showing a concept of a compound machine according to a second embodiment of the present invention.
Figure 13:
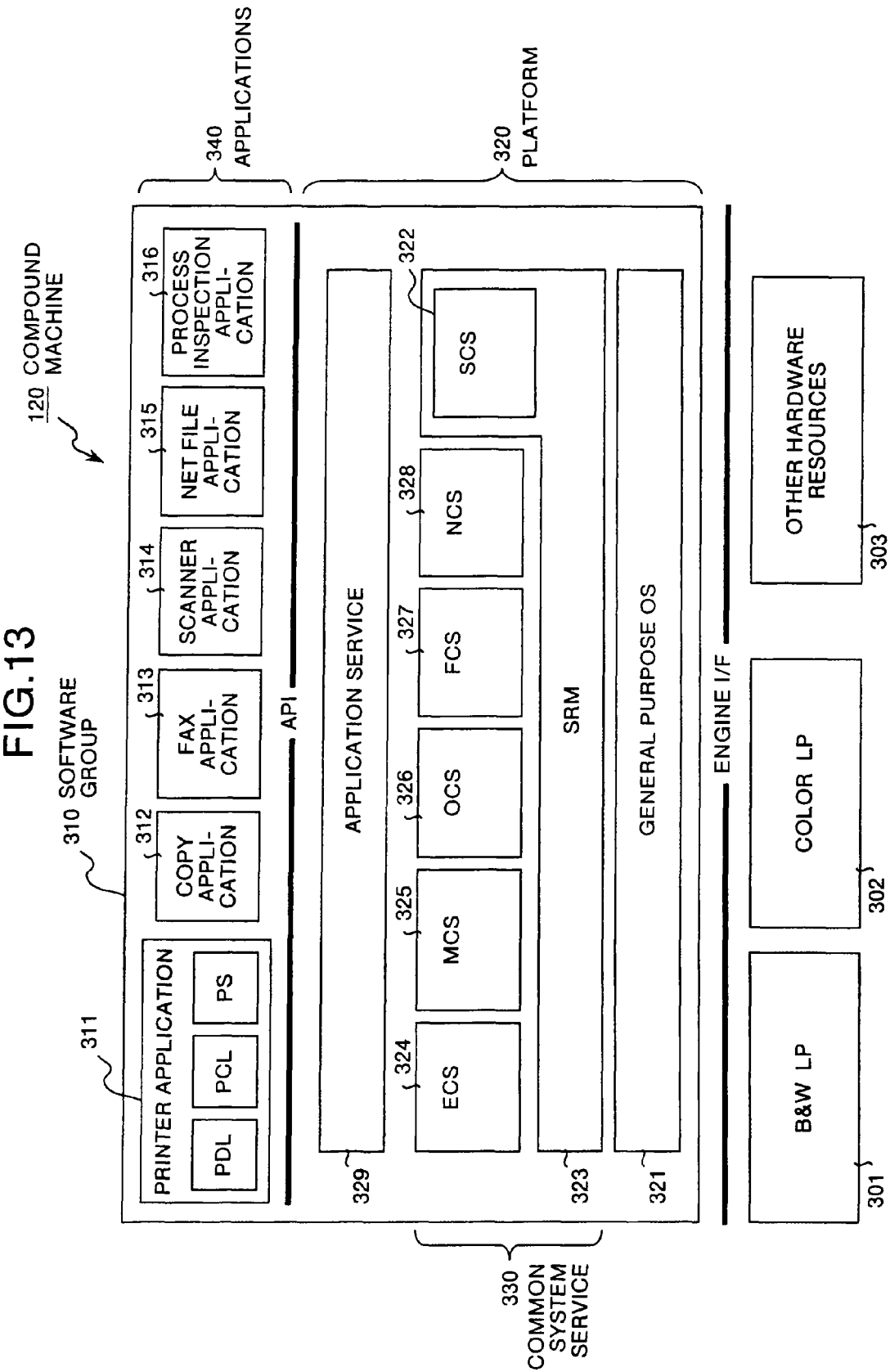
FIG. 13 is a configuration diagram showing a concrete software configuration of a compound machine shown in FIG. 12C.

A software configuration of the compound machine 120 shown in FIG. 12C will now be explained in more detail. FIG. 13 is a configuration diagram showing a concrete software configuration of the compound machine 120 shown in FIG. 12C.

As shown in FIG. 13, the compound machine 120 includes a black and white line printer (B&W LP) 301, a color line printer (Color LP) 302, and other hardware resources 303. In addition, a software group 310 includes a platform 320 and applications 340.

The platform 320 includes a general purpose OS 321, common system service 330, and application service 329. The platform 320 includes an application program interface, which makes it possible to receive a processing request from the applications by using a predefined function.

The general purpose OS 321 is a general purpose operating system such as UNIX, and executes software programs of the platform 320 and the applications 340 in parallel respectively as processes. By using open source UNIX, the safety of the programs can be ensured and correspondence to the network becomes possible, and the source code can be obtained easily. In addition, the royalty of the OS and TCP/IP is unnecessary, and outsourcing also becomes easy.

The common system service 330 provides the applications 340 with basic common service. The common system service 330 includes control service and a system resource manager (SRM) 323. The control service explained below interprets a processing request issued by the applications 340 and generates an acquisition request of hardware resources. The SRM 323 manages one or more hardware resources and arbitrates between the acquisition requests from the control service.

The control service includes a plurality of service modules. To be concrete, the control service includes SCS (system control service) 322, ECS (engine control service) 324, MCS (memory control service) 325, OCS (operation panel control service) 326, FCS (FAX control service) 327, and NCS (network control service) 328.

The SRM 323 conducts system control and resource management in cooperation with the SCS 322. In accordance with a request from a high order layer utilizing hardware resources of an engine such as a scanner portion or a printer portion, a memory, an HDD file, and a host I/O (such as a centro-I/F, a network I/F, an IEEE 1394 I/F, and an RS 232C I/F), the SRM 323 conducts arbitration and execution control.

To be concrete, the SRM 323 determines whether requested hardware resources are available (whether the requested hardware resources are not utilized by other requests). If available, the SRM 323 notifies a high order layer that the requested hardware resources are available. Further, the SRM 323 may conduct utilization scheduling of hardware resources in response to a request from a high order layer, and directly carry out request contents (for example, such as paper conveyance and image formation operation, memory insurance, file generation).

The SCS 322 conducts (1) application management, (2) operation portion control, (3) system screen display (such as job list screen and counter display screen), (4) LED display, (5) resource management, and (6) interrupt application control. To be concrete, (1) in application management, registration of an application and processing of notifying its information to another application are conducted. As for the application which has been registered, an engine state is notified to the application according to the system setting and request setting from an application. Further, as for applications already registered, an enquiry as to whether system state transition is possible, such as enquiry of power mode shift or an interrupt mode, is conducted.

Further, (2) in operation section control, exclusive control of the right of using the operation section of an application is conducted. Moreover, key information from an operation section driver (OCS) is notified exclusively to an application having the right of using the operation section. This key information conducts mask control of temporarily stopping notification according to the state transition of the system such as during application switchover.

Further, (3) in the system screen display, an alarm screen corresponding to the engine state is displayed according to a request content from an application having the right of using the operation section. Among them, there is one that turns on/off alarm display according to the application state such as a user restriction screen. Other than the engine state, there is conducted display control of a job list screen for displaying a job reservation and execution situation, a counter screen for displaying total counters, and a screen indicating that the CSS is being notified. As for the system screen displays of them, the application is not requested to release the right of using the operation section and drawing is conducted as a system screen covering the application screen.

Further, (4) in LED display, display control of a system LED, such as an alarm LED or an application key, is conducted. As for an LED peculiar to an application, the application controls it by directly using a display driver.

Further, (5) in resource management, there is conducted service for exclusive control of engine resources (such as a scanner and a staple) that must be excluded when an application (ECS) executes a job. (6) In interrupt application control, there are conducted control and service for causing a specific application to operate preferentially.

The ECS 324 controls an engine such as the black and white line printer (B&W LP) 301, the color line printer (Color LP) 302, and the other hardware resource 303. The ECS 324 conducts image reading, print operation, state notification, jam recovery, and so on.

To be concrete, a series of copy/scan/print operations are implemented by successively issuing print requests to the SRM 323 in accordance with job mode specification received from the applications 340. Subject jobs handled by the ECS 324 are jobs with a scanner specified as an image input device or jobs with a plotter specified as an image output device.

For example, in the case of copy operation, "SCANNER.fwdarw.PLOTTER" is specified. In the case of file storage, "SCANNER.fwdarw.MEMORY" is specified. In the case of facsimile transmission, "SCANNER.fwdarw.FAX_IN" is specified. In the case of stored file print or print from the printer application 311, "MEMORY.fwdarw.PLOTTER" is specified. In the case of facsimile reception, "FAX_OUT.fwdarw.PLOTTER" is specified.

Although the definition of job differs depending upon application, processing operation for one set of images handled by the user is herein defined as one job. For example, in the case of an ADF (automatic document feeder) mode of copy, operation of reading one set of manuscripts put on a manuscript stand becomes one job. In a pressure plate mode, reading operation conducted as far as the final manuscript is fixed becomes one job. In the case of the copy application 312, operation of copying one bundle of manuscripts becomes one job. In the case of the fax application 313, transmission operation of one document or reception operation of one document becomes one job. In the case of the printer application, print operation of one document becomes one job.

The MCS 325 conducts memory control. To be concrete, the MCS 325 conducts acquisition and release of an image memory, utilization of a hard disk device (HDD), and image data compression and expansion.

As functions required to manage information needed as image data files stored in the hard disk device, there are (1) file access (generation/deletion/open/close) function (including exclusive processing), (2) management of various file attributes (management of image data of physical page units as files) such as file name/ID management (file/user)/password management/storage time management/the number of pages/data format (such as compression system)/access restriction/generating application/print condition management, (3) jointing/insertion/disconnection function by taking a file as the unit and taking a page as the unit, (4) file sort function (in the order of storage time/in the order of user ID or the like), (5) notification of all file information (for display/retrieval), (6) recovery function (file/page discard of a damaged file), and (7) automatic file deletion function.

As functions for retaining image data in a memory such as a RAM and accessing the image data, there are (1) a function of acquiring file and page/band attribute information from the applications 340, and (2) functions of securing, releasing, reading and writing an image data area from the applications 340.

The OCS 326 is a module for controlling an operation panel which serves as information transfer means between the operator and main body control. The OCS 326 conducts processing of notifying a key operation event of the operator to the main body control, processing of providing a library function for each application to construct a GUI, processing of managing the constructed GUI information application to application, and display reflection processing onto an operation panel.

The OCS 326 has (1) a library providing function for GUI construction, (2) an operation section hardware resource management function, (3) VRAM drawing/LCD display function (hardware display, display application switchover, display language switchover, window dark color display, message/icon blink display, message joint display), (4) hard key input detection function, (5) touch panel key input detection function, (6) LED output function, (7) buzzer output function.

The FCS 327 provides an API for conducting facsimile transmission and reception using a PSTN/ISDN network, registration/citation of various facsimile data managed by BKM (backup SRAM), facsimile reading, facsimile reception print, and fused transmission and reception, from each application layer of a system controller.

To be concrete, the FCS 327 has (1) a transmission function of transmitting a document requested to be transmitted by an application layer, to a facsimile receiver by using a PSTN/ISDN network, (2) reception function of transferring and printing a facsimile reception screen and various reports received from the PSTN/ISDN network, (3) telephone directory citation and registration function of conducting citation and/or registration of facsimile management items such as a telephone directory and group information stored in a fax board, (4) a fax log notification function of notifying transmission and reception result history information stored in the BKM mounted on a fax board to an application which needs it, and (5) an event notification function of notifying a changed event to an application registered in the FCS when there has been a state change of the fax board.

The NCS 328 is a group of modules for providing applications needing a network I/O with service which can be utilized in common. The NCS 328 distributes data received from the network side by using each protocol among applications, and acts as an intermediary when an application transmits data to the network side. To be concrete, the NCS 328 has server demons such as ftpd, httpd, lpd, snmpd, telnetd, and smtpd, and client functions of the same protocol.

The application service 329 is one of common services included in the plat form 320. However, the application service 329 provides service on the side of the applications 340, unlike the ECS 324, MCS 325, OCS 326, FCS 327, NCS 328, SRM 323, and SCS 322 formed the common system service 330.

In other words, the application service 329 lies between the applications 340 and the common system service 330, and plays a role of mediating between them.

To be concrete, the application service 329 executes as proxy collectively functions of job generation and data communication, which should be originally performed by a copy application 312, a fax application 313, a scanner application 314, or the like. Therefore, the copy application 312, the fax application 313, the scanner application 314, or the like needs only act by taking the screen or key operation as a subject. As a result, the development efficiency of the applications is improved.

The applications 340 includes a printer application 311, which is an application for printer having a page description language (PDL), a PCL and a post script (PS), the copy application 312, which is an application for copy, the fax application 313, which is an application for facsimile, the scanner application 314, which is an application for scanner, a net file application 315, which is an application for net file, and a process inspection application 316, which is an application for process inspection.

Since each of the applications 311 to 316 can execute operation by utilizing processes on the platform 320, a screen display control program, which conducts screen control, and key operation control, forms its main constituent. Especially, since the application service 329 is provided on the platform 320, each of the applications 311 to 316 need not have the functions of job generation and data communication. A new application may also be mounted via a network connected by the NCS 328. Applications can be added or deleted application by application.

Copy operation using the copy application 312, print operation using the printer application 311, and scanner operation using the scanner application 314 shown in FIG. 13 will now be explained further concretely.

Figure 14:
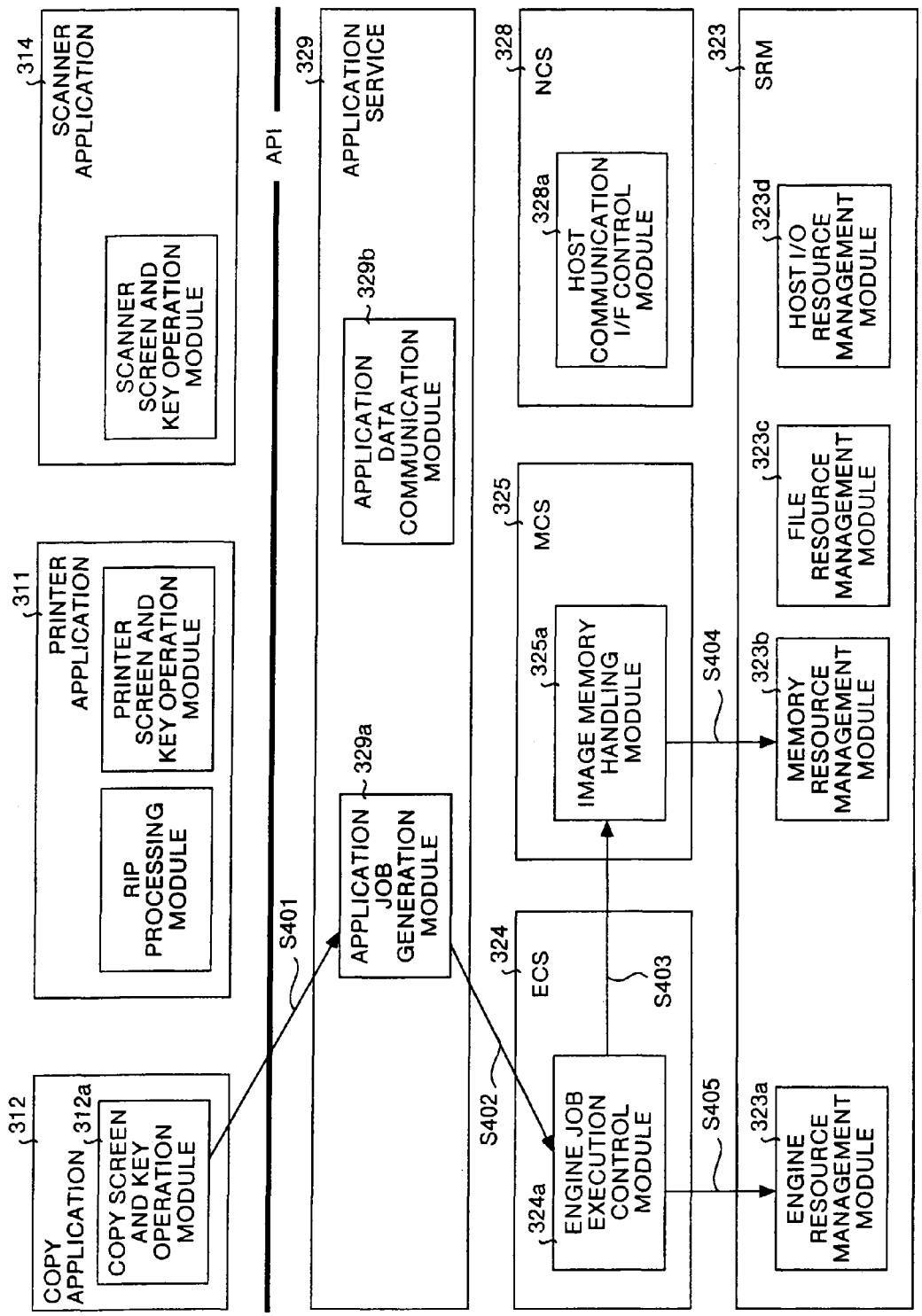
FIG. 14 is a diagram showing copy operation using a copy application shown in FIG. 13.

FIG. 14 is a diagram showing copy operation using the copy application 312 shown in FIG. 13. As shown in FIG. 14, the copy application 312 has a copy screen and key operation module 312a. If a copy condition is specified from an operation panel and a start key is depressed, then the copy screen and key operation module 312a transfers the copy condition to an application job generation module 329a of the application service 329 (step S401). The copy condition includes paper size, the number of copies, both sides, sort, and staple.

Thereafter, the application job generation module 329a calls an engine job generation function of an engine job execution control module 324a by using an API of the ECS 324, and sets a job mode. Such a job mode is a group of parameters required to activate a scanner, a plotter, a finisher, or the like, and it is generated from the copy condition. In addition, the application job generation module 329a calls a job execution start function of the engine job execution control module 324a by using an API of the ECS 324, and orders job execution (step S402).

The engine job execution control module 324a calls an image memory insurance function of an image memory handling module 325a by using an API of the MCS 325, and orders insurance of an image memory (step S403).

The image memory handling module 325a calls a memory acquisition function of a memory resource management module 323b of the SRM 323, and acquires a memory (step S404). The engine job execution control module 324a calls a resource acquisition function of an engine resource management module of the SRM 323, starts operation of a scanner and a plotter, and executes a copy job.

Figure 15:
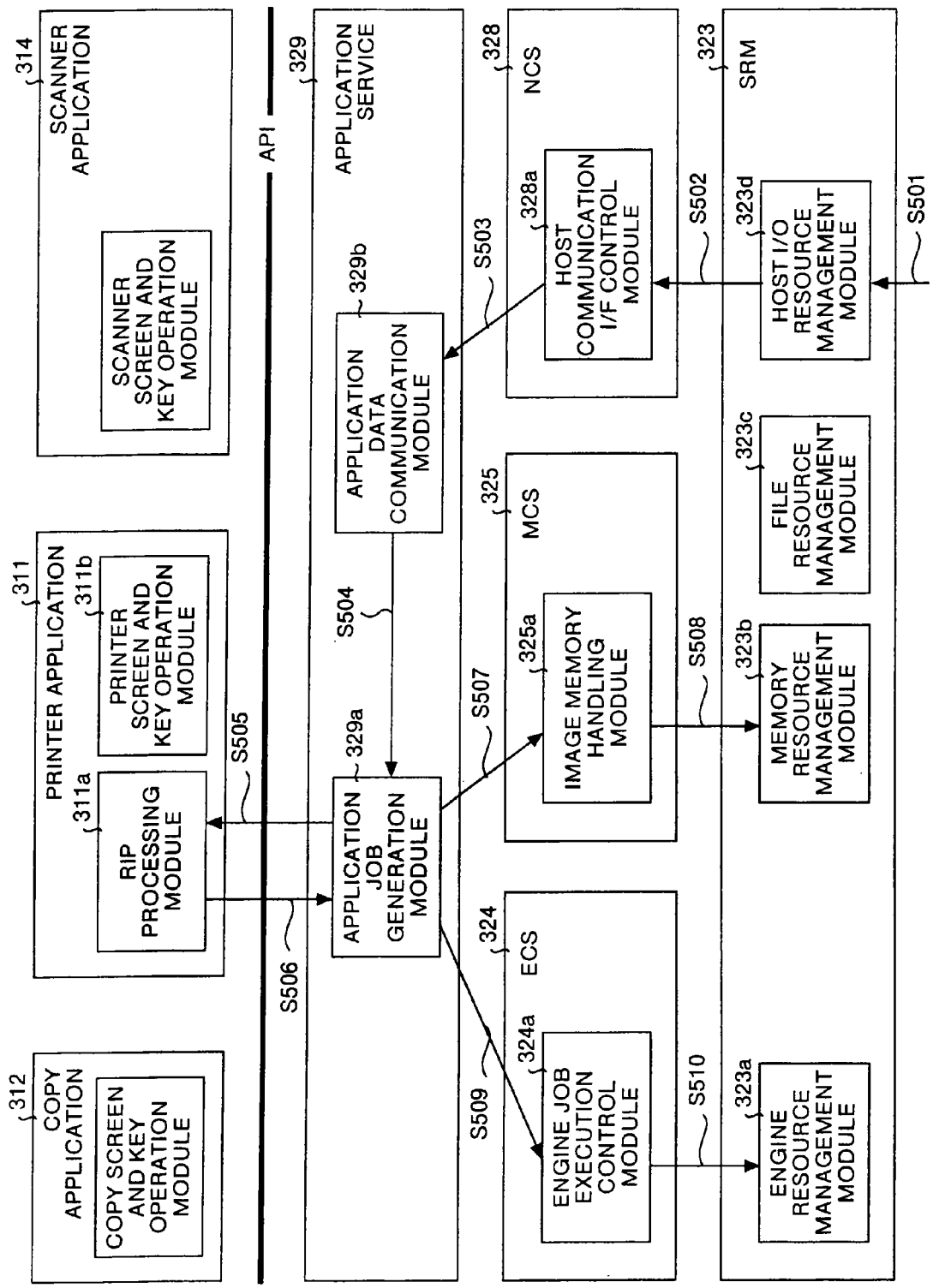
FIG. 15 is a diagram showing print operation using a printer application shown in FIG. 13.

Print operation using the printer application 311 shown in FIG. 13 will now be explained more concretely. FIG. 15 is a diagram showing print operation using the printer application 311 shown in FIG. 13. As shown in FIG. 15, the printer application 311 includes an RIP processing module 311a, and a printer screen and key operation module 311b.

If a print data command from a host such as a PC is input to a host I/O resource management module 323d of the SRM 323 via a centro-I/F, a USB I/F, a network I/F and so on (step S501), then the I/O resource management module 323d transfers the print data to a host communication I/F control module 328a of the NCS 328. The host communication I/F control module 328a analyzes the input print data, and judges a destination application. The host communication I/F control module 328a receives data from a plurality of communication protocols or host I/Fs, and arbitrates a destination (step S502).

If print data is transferred to a print data communication module 329b in the application service 329 (step S503), then the print data is further input to the application job generation module 329a and a new print job is generated (step S504).

The application job generation module 329a transfers data to the RIP processing module 311a of the printer application 311 according to the language kind of the print data (step S505) The RIP processing module 311a conducts image development of the print data, and thereafter returns its result to the application job generation module 329a (step S506).

Image data generated by the application job generation module 329a is output to the image memory handling module 325a of the MCS 325 (step S507). Requests to the image memory are generated by a plurality of applications. Therefore, a memory insurance request is issued to the memory resource management module 323b of the SRM 323, which arbitrates memory resources. The image data developed after being acquired is written onto a memory (step S508).

If print preparation of the image data is completed, then the application job generation module 329a calls an engine job generation function of the engine job execution control module 324a by using the API of the ECS 324, conducts job mode setting, then calls a job start function, and orders job execution (step S509).

The engine job execution control module 324a calls an engine resource acquisition function of an engine resource management module 323a of the SRM 323, starts plotter operation, and executes a print job (step S510).

Figure 16:
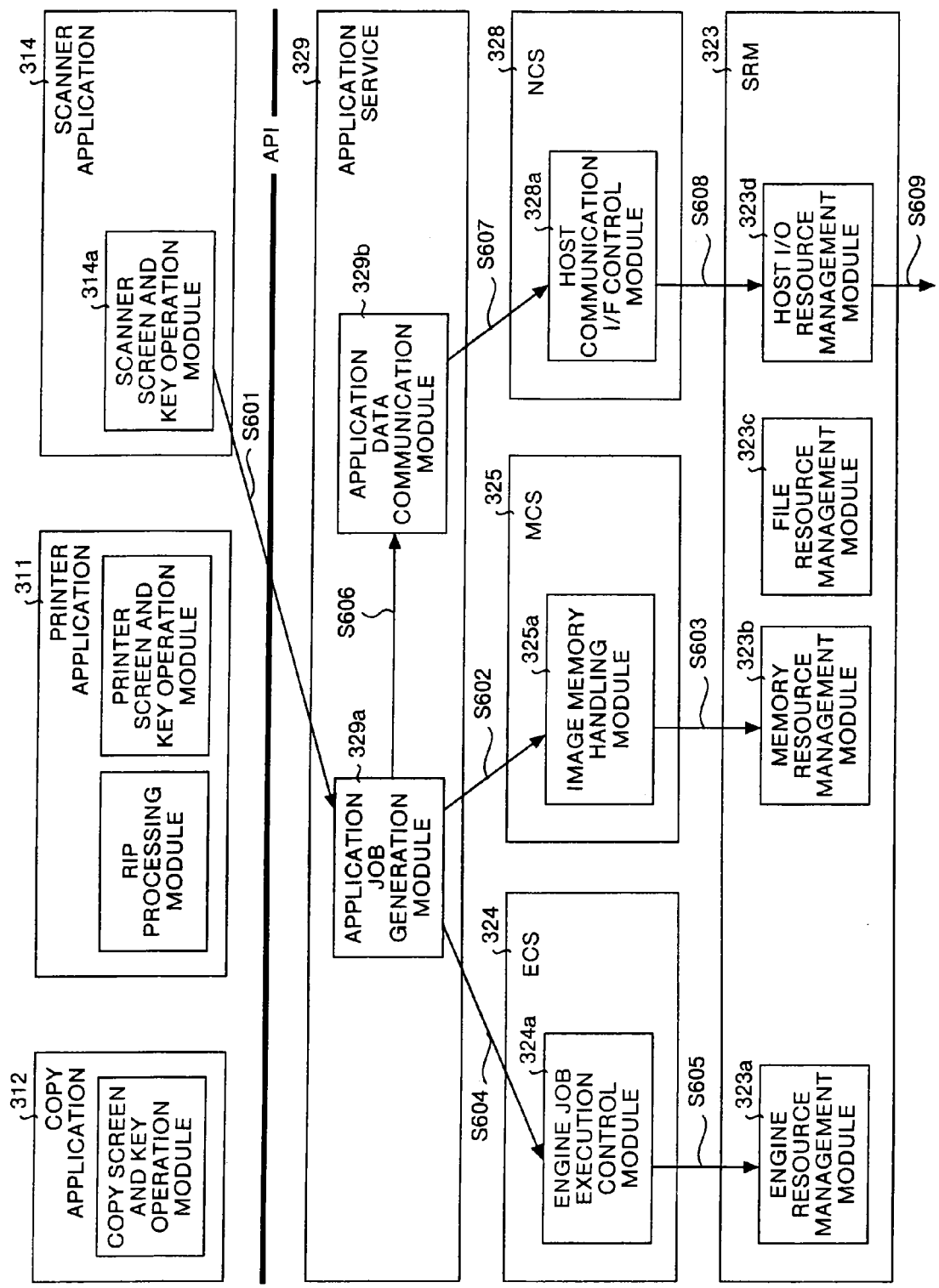
FIG. 16 is a diagram showing scanner operation using a scanner application shown in FIG. 13.

The scanner operation using the scanner application 314 shown in FIG. 13 will be explained further concretely. FIG. 16 is a diagram showing the scanner operation using the scanner application 314 shown in FIG. 13. As shown in FIG. 16, the scanner application 314 includes a scanner screen and key operation module 314a.

On the operation panel, the scanner application 314 is selected, a scan condition is input, and the start key is depressed. Thereupon, the scanner screen and key operation module 314a transfers the scan condition to the application job generation module 329a of the application service 329 (step S601). The application job generation module 329a activates the image memory handling module 325a of the MCS 325. In order to ensure a memory required for scan in accordance with a requested image size, the image memory handling module 325a of the MCS 325 issues a memory insurance request to the memory resource management module 323b of the SRM 323, which conducts arbitration of memory resources. After a memory has been acquired, image data is written on the memory (steps S602 and S603).

If scan preparation of image data is completed, then the application job generation module 329a calls the engine job generation function of the engine job execution control module 324a of the ECS 324, conducts job mode setting, then calls a job start function, and orders job execution (step S604).

The engine job execution control module 324a calls the engine resource acquisition function of the engine resource management module 323a of the SRM 323, starts scanner operation, and executes a scanner job (step S605).

The application job generation module 329a receives a scan completion event from the ECS 324. In order to transfer a read image to an external PC by utilizing host I/O resources such as a network, the application data communication module 329b sends an address of a transfer destination PC such as a URL and scanned image data (or an address on a memory) to the host communication I/F control module 328a of the NCS 328 (steps S606 and S607). Here, image data communication is controlled by using a protocol function for conducting file transfer, such as ftp or http.

In order to ensure host I/O resources, such as a network, IEEE 1394, USB, and SCSI, the host communication I/F control module 328a calls a resource insurance function of the host I/O resource management module 323d of the SRM 323 (step S608). At a time point when the requested host I/O resources have become available, the host I/O resource management module 323d conducts image data communication (step S609).

Figure 17:
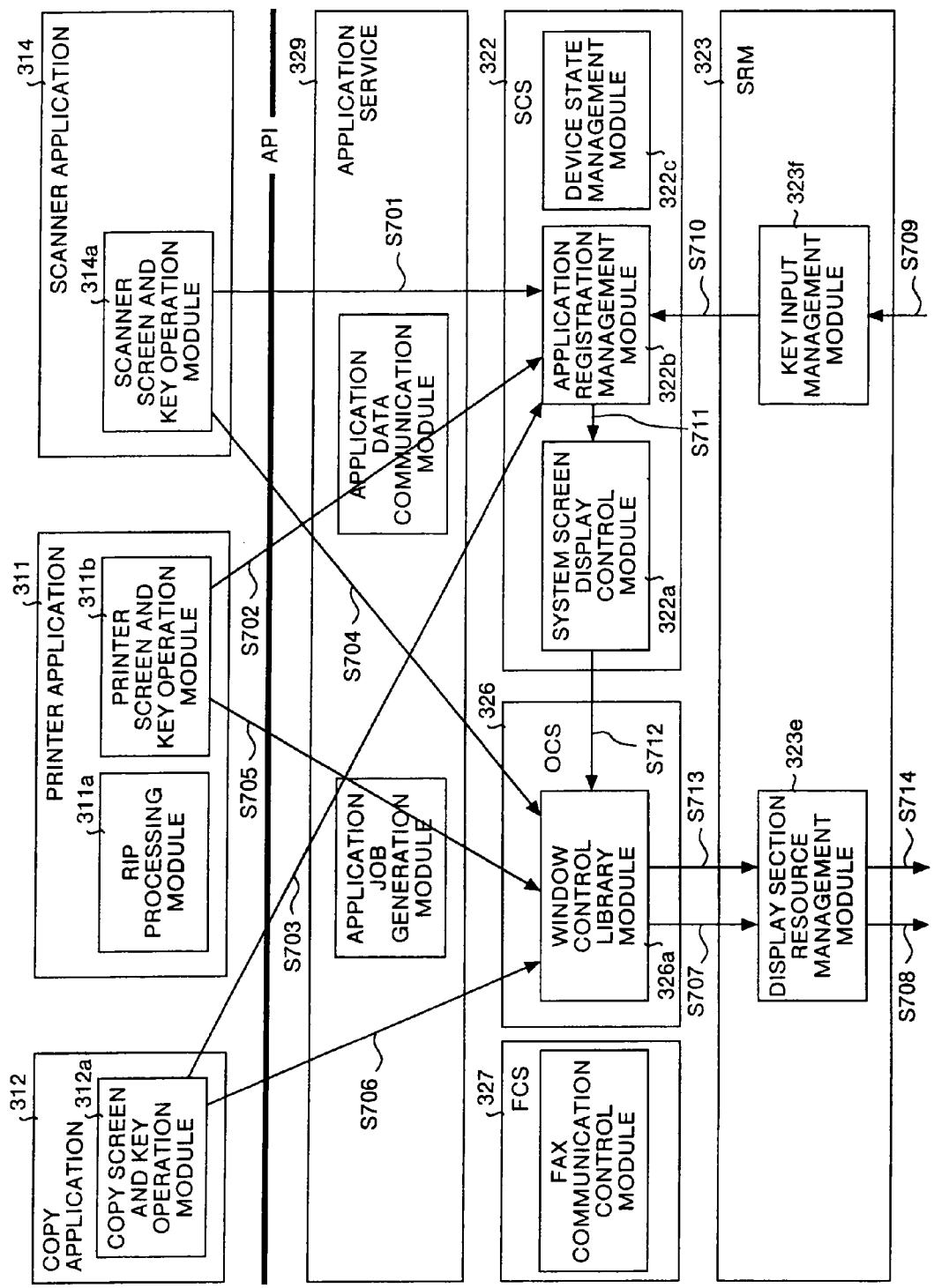
FIG. 17 is a diagram showing processing of a copy application, a printer application, and a scanner application at the time of start, processing of generating and displaying respective application screens, and processing conducted when an application screen selection key is depressed.

Processing conducted at the time of start of three applications: the copy application 312, the printer application 311 and the scanner application 314, processing for generating and displaying respective application screens, and processing conducted when an application screen selection key is depressed will now be explained. FIG. 17 is a diagram showing processing conducted at the time of start of three applications: the copy application 312, the printer application 311 and the scanner application 314, processing for generating and displaying respective application screens, and processing conducted when an application screen selection key is depressed.

Processing at the time of start of application: At the time of power on and system reset, an application is started after at least SCS 322 and OCS 326 have been started. The copy application 312, the printer application 311, or the scanner application 314 registers a fact that it has been started in an application registration management module 322b of the SCS 322 (steps S701 to S703).

Screen generation processing: The OCS 326 has such a drawing management function that each of a plurality of applications can have a plurality of virtual screen memories. Therefore, each of the copy application 312, the printer application 311, and the scanner application 314 can execute screen generation by using a window control library module 326a (steps S704 to S708).

Display processing: One of a plurality of screen memories is drawn on a display panel. A screen formed by combining contents of a plurality of screen memories may also be displayed. For example, in the case where fax reception has been conducted during copy operation, the fact that fax reception is being conducted can be displayed in a screen area common to applications.

Screen switchover processing: A screen memory drawn on the display panel is switched over by a system screen display control module of the SCS 322. For example, in the case where the application selection key on the operation panel is depressed, an application screen selected according to steps S709 to S714 is drawn. A device state management module 322*c* which holds state information of hardware within a device or an engine is included in the SCS 322. Therefore, a display screen at the time of an error or an abnormality such as a jam or paper absence can be switched over.

Figure 18:
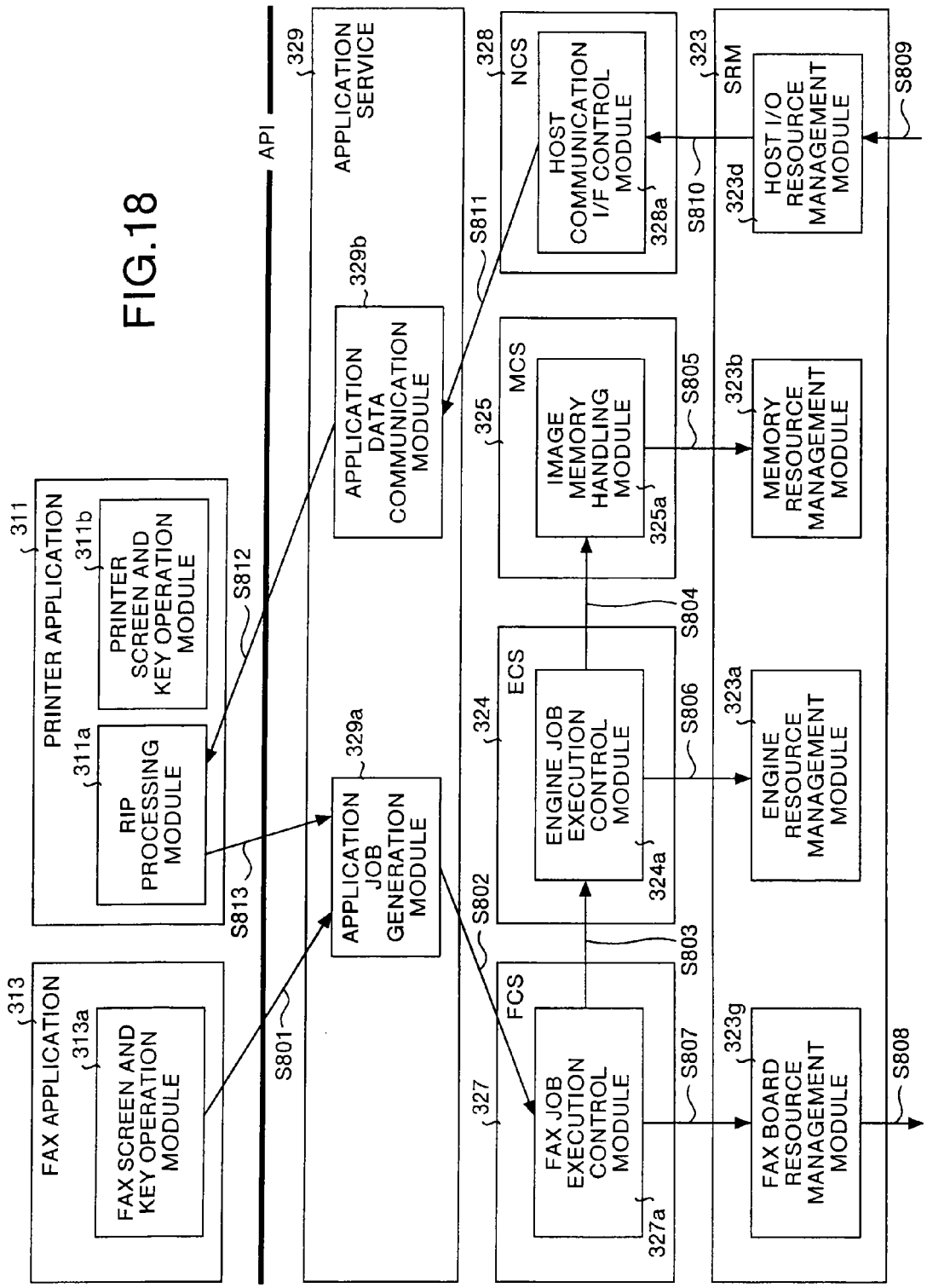
FIG. 18 is a diagram showing facsimile transmission operation using a facsimile application or a printer application.

Fax transmission operation using the fax application 313 or the printer application 311 will now be explained. FIG. 18 is a diagram showing fax transmission operation using the fax application 313 or the printer application 311.

By referring to FIG. 18, fax transmission operation using the fax application 313 will now be explained. On a fax operation screen, a transmission destination number is input and a start key is depressed. Thereupon, a fax screen and key operation module 313*a* calls a job generation function of the application job generation module 329*a* of the application service 329 (step S801). The fax job generation module 313*b* calls a transmission start function of a fax job execution control module 327*a* of the FCS 327 (step S802).

Thereupon, the fax job execution control module 327*a* calls the engine job generation function of the engine job execution control module 324*a* by using the API of the ECS 324, and sets a job mode (step S803). The engine job execution control module 324*a* calls an image memory insurance function of the image memory handling module 325*a* by using the API of the MCS 325, and orders insurance of an image memory (step S804).

The image memory handling module 325*a* calls the memory acquisition function of the SRM 323, and acquires a memory required to scan a fax manuscript (step S805). If a memory is secured, then the engine job execution control module 324*a* calls a function of requesting insurance of scanner resources, of the engine resource management module 323*a* of the SRM 323, and starts scanner operation after the scanner resources have been secured (step S806).

When manuscript image data from the scanner is retained on a memory, the ECS 324 notifies a scan completion event to the FCS 327. The fax job execution control module 327*a* calls a transmission start function of a fax board resource management module 323*g*. A fax transmission procedure is started by using a PSTN, an ISDN line, and so on (steps S807 and S808).

As for fax transmission operation using the printer application 311, print data is input to the host I/O resource management module 323*d* in the same way as the typical print operation. At that time, command information including information required for facsimile transmission, such as a transmission destination number, is added (step S809).

Print data for fax transmission is transferred from the host communication I/F control module of the NCS 328 to the application job generation module 329*a* via the application data communication module 329*b* of the application service 329 (steps S810 to S812). Thereupon, a new print job for fax transmission is generated.

Moreover, the print data is transferred to the RIP processing module 311*a*, and image data is generated. The image data is input to the fax job execution control module 327*a* of the FCS 327 together with information required for facsimile transmission (steps S813 to 815). Thereafter, processing similar to the fax transmission operation is conducted (steps S807 and S808).

Instead of conducting the RIP processing by using the steps S813 and S814, print data may be transmitted by means of a protocol (BFTP: binary file transfer protocol), which conducts transfer of binary data by using a PSTN, an ISDN line, and so on.

For convenience of explanation, only transmission operation has been explained. For example, however, fax reception and printing become possible by conducting processing in the order of steps S808, S807, S802, S803, S804, S805 and S806. Reception and printing of printing data using the BFTP can be implemented by conducting processing in the order of steps S808, S807, S802, S815, S813, S814, S815, S803, S804, S805 and S806.

A hardware configuration of the compound machine 120 shown in FIG. 12 will now be explained. FIG. 9 is a configuration diagram showing a hardware configuration of the compound machine 120 shown in FIG. 12. As shown in FIG. 9, the compound machine 120 includes a controller board 900. In the controller board 900, a CPU 902, an SDRAM 903, a flash memory 904, and an HD 905 are connected to an ASIC 901. The compound machine 120 includes an operation panel 910, a fax control unit (FCU) 920, a USB 930, an IEEE 1394 940, and a printer 950.

The operation panel 910 is connected directly to the ASIC 901. The FCU 920, the USB 930, the IEEE 1394 940, and the printer 950 are connected to the ASIC 901 via a PCI bus.

FIG. 10 is a block diagram showing a detailed configuration of the ASIC 901 shown in FIG. 9. As shown in FIG. 10, the ASIC 901 includes a CPU interface (CPU I/F), an SDRAM interface (SDRAM I/F), a local bus interface (Local BUS I/F), a PCI interface (PCI I/F), a 1284, an MAC (media access controller), an I/O, an OPE interface (OPE I/F), an HD interface (HD I/F), a Comp/de-comp, and a Rotate.

By adopting such a hardware configuration, a low cost design owing to device sharing becomes possible and fusion between applications becomes easy. An architecture which is scalable from a low speed machine to a high speed machine is obtained. Hardware/software used in applications is made common. The development efficiency can be improved. It becomes easy to cope with a novel function.

As heretofore described, the third embodiment is formed so as to extract the common part of applications as the application service 121*b* and the common system service 121*a*, form the platform 122 by using the application service 121*b* and the common system service 121*a* and the general purpose OS 111, and mount the printer application 123, the copy application 124, and the various applications 125 on the platform 122. Therefore, the development labor of each application can be reduced, and applications can be made slim.

According to yet another aspect of this invention, the image formation apparatus includes applications each of which conducts processing peculiar to user service such as print, copy, or facsimile and which can be mounted in a plurality on the image formation apparatus; and a platform which is interposed between the applications and the hardware resources, and which conducts management of the hardware resources, execution control and image formation processing needed in common by at least two of the applications when providing the user service. In addition, the platform includes: common system service which conducts management of the hardware resources, execution control and image formation processing; and application service which is interposed between the plurality of applications and the common system service and which at least conducts job generation corresponding to applications. When creating an application of each user service, therefore, only portions of the screen display control and key operation need to be created.

Further, there is provided in the platform an application program interface which enables reception of a processing request from the applications by using a predefined function. Therefore, smooth cooperation between the applications and the platform can be maintained.

Further, the common system service includes: control service which interprets a processing request from the applications and causes an acquisition request of the hardware resources to be generated; and a system resource manager which manages one or more hardware resources and arbitrates between acquisition requests from the control service. Therefore, each application can utilize hardware resources smoothly.

Further, the control service includes a plurality of service modules. Therefore, function expansion or function modification of the platform can be implemented in the module level.

Further, the service modules include modules of at least two from among engine control service which controls an engine, memory control service which controls a memory and a hard disk, operation panel control service which controls an operation panel, fax control service which controls fax communication, and network control service which controls network communication. Therefore, the engine control, memory control, operation panel control, fax communication control, or network communication control can be conducted by using the platform.

Further, the service modules include at least network control service which controls network communication, and the applications are acquired and mounted via a network connected by the network control service. Therefore, a new application can be mounted efficiently via an external network.

Further, the platform further includes a general purpose operating system, and the system resource manager manages the one or more hardware resources via the general purpose operating system. Therefore, the hardware resources can be managed efficiently by process execution under the general purpose operating system.

Further, applications can be added or deleted application by application. Therefore, the function of the image formation apparatus can be optimized in a form desired by the user.

Further, applications conduct screen control and key operation control relating to services of print, copy and facsimile. Therefore, various kinds of processing can be implemented by using a simple application which conducts processing relating to such a user interface.

Further, a plurality of applications include at least printer application, copy application, fax application, scanner application, net file application, and process inspection application. Therefore, the user can use the printer, copy, fax, scanner, net file, and process inspection.

Further, the application service includes: a job generation module which generates a job corresponding to each application; and a data communication module which conducts data communication relating to each application. Therefore, job generation and data communication can be conducted in common to the applications.

According to another aspect of this invention, processing peculiar to user service such as print, copy, or facsimile is conducted by using applications which can be mounted in a plurality; and management of the hardware resources, execution control and image formation processing needed in common by at least two of the applications are conducted, when providing the user service, by using a platform. In addition, the platform includes common system service which is interposed between the applications and the hardware resources and which conducts management of the hardware resources, execution control and image formation processing, and application service which is interposed between the applications and the common system service and which conducts at least job generation corresponding to an application. When creating an application of each user service, therefore, only portions of the screen display control and key operation need to be created.

According to still another aspect of this invention, each of the application programs is executed to operate on a platform, when providing user service such as print, copy, or facsimile. In addition, the platform includes common system service which conducts management of the hardware resources, execution control and image formation processing, and application service which is interposed between the applications and the common system service and which conducts at least job generation corresponding to an application. Therefore, application programs each having a reduced processing burden by using the platform can be provided.

The present document incorporates by reference the entire contents of Japanese priority documents, 2000-204235 filed in Japan on Jul. 5, 2000, 2000-204257 filed in Japan on Jul. 5, 2000, 2001-147014 filed in Japan on May 16, 2001 and 2001-147015 filed in Japan on May 16, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. An apparatus, comprising:
   a processor;
   a printing device;
   a scanner device; and
   a memory configured to store
      a plurality of applications executed by the processor, each of the plurality of applications providing an image forming process using at least one of the printing device and the scanner device, and each of the plurality of applications being capable of being added to the apparatus; and
      a platform program executed by the processor, the platform program configured to execute an image forming process using at least one of the printing device and the scanner device in response to receiving a request for performing the image forming process from one of the plurality of applications via a predetermined interface, wherein
   the platform program includes
      a first module executed by the processor and configured to generate a job based on the request received from the one of the plurality of applications, the first module configured to be shared by the plurality of applications via the predetermined interface; and
      a second module executed by the processor and configured to execute the job generated by the first module using at least one of the printing device and the scanner device.

2. The apparatus of claim 1, wherein
   the request sent from one of the plurality of applications includes a specification of hardware, and the platform program determines the at least one of the printing device and the scanner device based on the specification of hardware included in the request.

3. The apparatus of claim 1, wherein
the predetermined interface is an application program interface, and
the platform program receives the request from the one of the plurality of applications via the application program interface.

4. An image forming method performed by an apparatus having a processor, a printing device, a scanner device, and a memory configured to store a plurality of applications and a platform program, the method comprising:
controlling, by the processor, execution of the plurality of applications, each of the plurality of applications providing an image forming process using at least one of the printing device and scanner device, and each of the plurality of applications being capable of being added to the apparatus;
controlling, by the processor, execution of the platform program, the platform program configured to execute an image forming process using at least one of the printing device and the scanner device in response to receiving a request for performing the image forming process from one of the plurality of applications via a predetermined interface;
generating, by a first module of the platform program, a job based on the request received from the one of the plurality of applications, the first module configured to be shared by the plurality of applications via the predetermined interface; and
executing, by a second module of the platform program, the job generated by the first module using at least one of the printing device and scanner device.

5. A non-transitory computer-readable medium including a plurality of applications and a platform program, which when executed by an apparatus having a processor, a printing device, and a scanner device, cause the apparatus to perform a method comprising:
controlling execution of the plurality of applications, each of the plurality of applications providing an image forming process using at least one of the printing device and scanner device, and each of the plurality of applications being capable of being added to the apparatus;
controlling execution of the platform program, the platform program configured to execute an image forming process using at least one of the printing device and the scanner device in response to receiving a request for performing the image forming process from one of the plurality of applications via a predetermined interface;
generating, by a first module of the platform program, a job based on the request received from the one of the plurality of applications, the first module configured to be shared by the plurality of applications via the predetermined interface; and
executing, by a second module of the platform program, the job generated by the first module using at least one of the printing device and scanner device.

6. The apparatus of claim 1, wherein
the plurality of applications include a copy application,
the first module executed by the processor is an application job generation module,
the copy application generates the request corresponding to a copy job based on an input received at an interface of the apparatus and sends the request to the application job generation module, and
the application job generation module determines to activate the printing device and the scanner device based on the request received from the copy application.

7. The apparatus of claim 6, wherein
the request generated by the copy application and sent to the application job generation module includes at least one of a paper size, a number of copies, a duplex printing setting, a sort setting and a staple setting.

8. The apparatus of claim 1, wherein
the plurality of applications include a scanner application,
the first module executed by the processor is an application job generation module,
the scanner application generates the request corresponding to a scan job based on an input received at an interface of the apparatus and sends the request to the application job generation module, and
the application job generation module determines to activate the scanner device based on the request received from the scanner application.

9. The apparatus of claim 1, further comprising:
a communication interface, wherein
the plurality of applications include a facsimile application,
the first module executed by the processor is an application job generation module,
the facsimile application generates the request corresponding to a facsimile job based on an input received at an interface of the apparatus and sends the request to the application job generation module, and
the application job generation module determines to activate the scanner device and the communication interface based on the first request received from the facsimile application.

10. The apparatus of claim 1, wherein
the request for image forming received at the platform program from the one of the plurality of applications via the predetermined interface does not include information identifying a hardware resource used to perform the image forming process.

* * * * *